(12) United States Patent
Abdallah

(10) Patent No.: US 8,327,115 B2
(45) Date of Patent: Dec. 4, 2012

(54) PLURAL MATRICES OF EXECUTION UNITS FOR PROCESSING MATRICES OF ROW DEPENDENT INSTRUCTIONS IN SINGLE CLOCK CYCLE IN SUPER OR SEPARATE MODE

(75) Inventor: Mohammad A. Abdallah, Folsom, CA (US)

(73) Assignee: Soft Machines, Inc., El Dorado Hills, CA (US)

( * ) Notice: Subject to any disclaimer, the term of this patent is extended or adjusted under 35 U.S.C. 154(b) by 0 days.

(21) Appl. No.: 12/296,919

(22) PCT Filed: Apr. 12, 2007

(86) PCT No.: PCT/US2007/006536
§ 371 (c)(1),
(2), (4) Date: Dec. 19, 2008

(87) PCT Pub. No.: WO2007/143278
PCT Pub. Date: Dec. 13, 2007

(65) Prior Publication Data
US 2009/0113170 A1    Apr. 30, 2009

(51) Int. Cl.
*G06F 15/76* (2006.01)

(52) U.S. Cl. .......................................... 712/17; 712/215
(58) Field of Classification Search ........................ None
See application file for complete search history.

(56) References Cited

U.S. PATENT DOCUMENTS

| 5,524,090 | A * | 6/1996 | Iwamura ....................... 708/625 |
| 7,171,535 | B2 * | 1/2007 | Naoi ............................. 711/169 |
| 7,418,579 | B2 * | 8/2008 | Guibert et al. ................ 712/226 |
| 2006/0095720 | A1 * | 5/2006 | Biles et al. ..................... 712/34 |
| 2009/0031104 | A1 * | 1/2009 | Vorbach et al. ................ 712/18 |

OTHER PUBLICATIONS

Nagarajan et al., "A Design Space Evaluation of Grid Processor Architectures", 34th ACM/IEEE International Symposium, Piscataway, NJ, Dec. 1-5, 2001, pp. 40-51.
Santos et al., "The 2D-VLIW Architecture", Mar. 2006, 13 pages, http://www.ic.unicamp.br/{reltech2006/06-06.pdf.
Soft Machines, Inc., European Patent Application No. 07811845.2, Extended European Search Report, Nov. 2, 2009, 7 pages.

* cited by examiner

*Primary Examiner* — Kenneth Kim
(74) *Attorney, Agent, or Firm* — Cooley LLP

(57) ABSTRACT

A matrix of execution blocks form a set of rows and columns. The rows support parallel execution of instructions and the columns support execution of dependent instructions. The matrix of execution blocks process a single block of instructions specifying parallel and dependent instructions.

16 Claims, 23 Drawing Sheets

$$
\begin{array}{r}
A_3\ A_2\ A_1\ A_0 \\
B_3\ B_2\ B_1\ B_0 \\
\hline
(A_3\ A_2\ A_1\ A_0)*B_0 \\
(A_3\ A_2\ A_1\ A_0)*B_1 \\
(A_3\ A_2\ A_1\ A_0)*B_2 \\
(A_3\ A_2\ A_1\ A_0)*B_3 \\
\hline
\end{array}
\quad *
\qquad +
$$

PLURAL MATRICES OF EXECUTION UNITS FOR PROCESSING MATRICES OF ROW DEPENDENT INSTRUCTIONS IN SINGLE CLOCK CYCLE IN SUPER OR SEPARATE MODE

BRIEF DESCRIPTION OF THE INVENTION

The invention relates generally to computer architectures. More particularly, the invention relates to a computer architecture to process matrix instructions specifying parallel and dependent operations.

BACKGROUND OF THE INVENTION

Improving computer architecture performance is a difficult task. Improvements have been sought through frequency scaling, Single Instruction Multiple Data (SIMD), Very Long Instruction Word (VLIW), multi-threading and multiple processor techniques. These approaches mainly target improvements in the throughput of program execution. Many of the techniques require software to explicitly unveil parallelism. In contrast, frequency scaling improves both throughput and latency without requiring software explicit annotation of parallelism. Recently, frequency scaling hit a power wall so improvements through frequency scaling are difficult. Thus, it is difficult to increase throughput unless massive explicit software parallelization is expressed.

In view of the foregoing, it would be desirable to improve computer architecture performance without reliance upon frequency scaling and massive explicit software parallelization.

SUMMARY OF THE INVENTION

A matrix of execution blocks form a set of rows and columns. The rows support parallel execution of instructions and the columns support execution of dependent instructions. The matrix of execution blocks process a single matrix of instructions specifying parallel and dependent instructions.

BRIEF DESCRIPTION OF THE FIGS.

The invention is more fully appreciated in connection with the following detailed description taken in conjunction with the accompanying drawings, in which:

FIG. 13 illustrates a prior art multiplication technique.

Like reference numerals refer to corresponding parts throughout the several views of the drawings.

DETAILED DESCRIPTION OF THE INVENTION

It is highly beneficial to allow software that is not explicitly parallelized to execute on single processor hardware that is capable of processing massive numbers of instructions in a short latency pipeline. To give a current perspective on current solutions; super scalar processors can practically process 4-5 instructions in a cycle at peak instants, which is similar to what a good VLIW compiler can achieve at peak instants. It is well recognized that scaling super scalar processors to schedule 10's of instructions in a single cycle/instant is not practically achievable. Similarly, compliers that try to parallelize general programs for VLIW architectures with 10's of slots end up leaving a lot of those slots unfilled.

The invention provides architecture and processor implementations enabling massive parallelism allowing large number of instructions is to be fetched, scheduled, decoded, and executed in a short pipeline, achieving an impressive improvement in the throughput of execution, while maintaining a much optimized latency of operations in single processor pipeline with efficient timing, power, area and routing.

In this new architecture, named Ultra Large Instruction Matrix (ULIM), fixed size instruction matrix templates are scheduled to be executed in the hardware as a matrix of parallel and dependent groups of instructions. In contrast to VLIW where only parallel instructions are scheduled using the Very Long Instruction width template, the template of the ULIM architecture encapsulates a group of instructions that have both parallel and dependent instructions. This can be viewed as a 2 dimensional template matrix where parallel instructions are allocated horizontally while dependent instructions are allocated only vertically. This template is sent as one instruction matrix to the execution hardware, where each execution block processes an instruction matrix.

Figure 1:
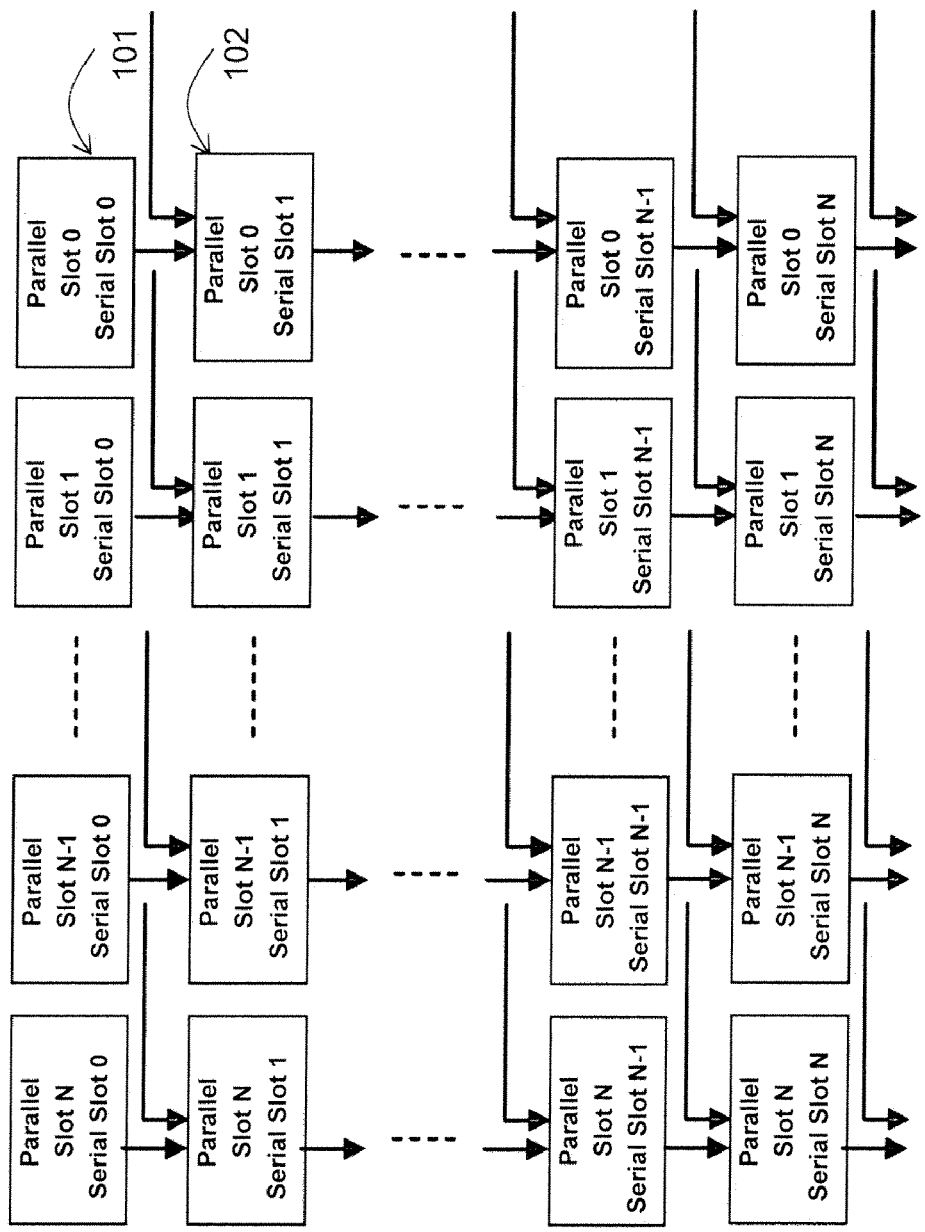
FIG. 1 illustrates an architecture to support the execution of parallel and dependent instructions in accordance with an embodiment of the invention.

FIG. 1 illustrates such a template where if an instruction is put in slot 101 then another instruction that can execute in parallel to it can be put in any of the parallel slots 1 to N in that same row. However, an instruction that depends on the one placed at slot 101 cannot be placed in the same row and has to be placed on a following row (e.g., parallel slot 0 of serial slot 1) 102. The slot noted by 102 can receive as an input either the result produced by 101 or an external input operand or a combination of both. The execution model of such an instruction template is that instructions at any row will execute before those in the next row.

The ULIM instructions' grouping can be scheduled statically by a ULIM compiler or dynamically by a ULIM hardware composition unit. The significance of this architecture is clear if it is compared to a traditional architecture. In a traditional architecture, one row of $N_1$ parallel instructions can be put in a template, such as VLIW or SIMD template. This means each cycle, $N_1$ instructions can be executed (all have to be insured to be parallel which is a serious constraint for a large N). On the other hand, the ULIM architecture can execute $N_1*N_2$ instructions each cycle by pipelining execution at each row boundary. In spite of executing $N_1*N_2$ instructions each cycle, the ULIM architecture imposes only the same constraint of insuring that $N_1$ instructions execute in parallel.

The instruction matrix template can be constructed by the programmer or by a compiler/hardware formatter where neither of them need to be constrained by finding only parallel instructions to schedule every cycle. Available parallel instructions can be picked and placed horizontally in rows. The parallel instructions can be augmented by dependent instructions that are placed in subsequent rows. A matrix can execute in a single or multiple cycles. A matrix can localize storage of operands near the execution hardware to optimize interconnect complexity, area, speed and power.

Figure 2A:
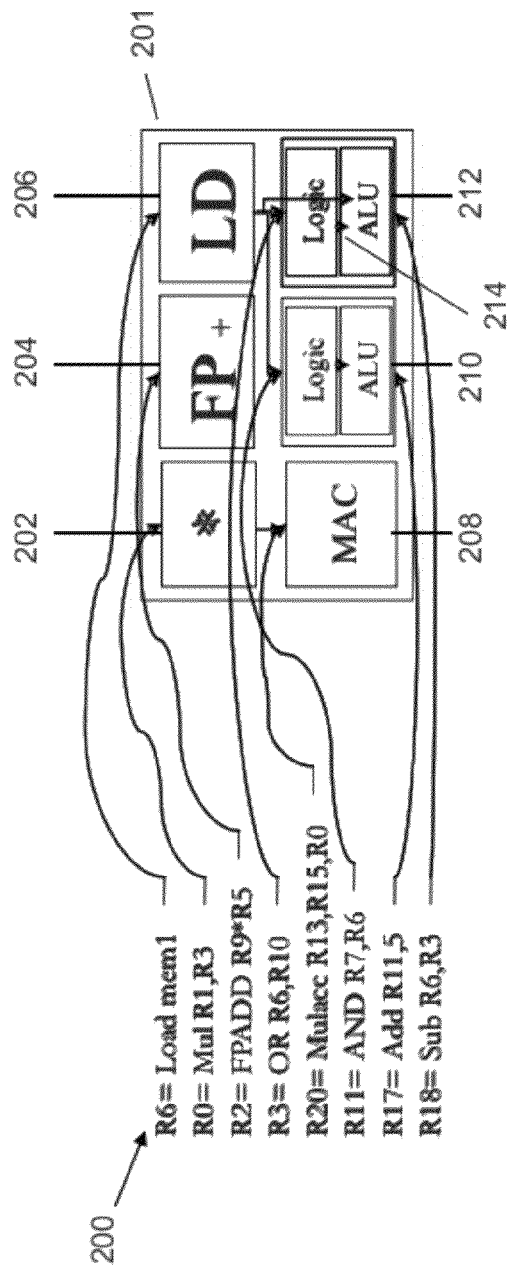
FIG. 2A illustrates the mapping of serial instructions to produce parallel and dependent operations in an execution matrix of the invention.

The invention is more fully appreciated in connection with the example of FIG. 2A. FIG. 2A illustrates an example of an instruction sequence 200 presented by a single serial program flow. The figure also shows how the instructions are grouped to form a single instruction matrix with both serial and parallel slots utilized in the matrix template. The matrix template is applied to an execution block 201. The execution block 201 includes a multiplication unit 202, a floating point add unit 204, a load unit 206, a multiple accumulate (MAC) unit 208, a logic unit (e.g., an ALU) 210, and another logic unit 212.

Thus, an instruction matrix refers to an instruction group template with parallel and serial instructions. An execution block refers to a group of execution units that execute an instruction matrix. Execution units are individual computation units (e.g., both complex and simple units) within an execution block.

Straight arrows, such as 214, indicate a dependency between instructions. The mapping can be done by the compiler, by the front end hardware or by a run time environment. FIG. 2A also depicts a formatted operation map showing the relative physical location of the instructions in the matrix as they will be executed on the corresponding hardware locations with parallel and serial dependency indicators.

As shown in FIG. 2A, the single stream program is reformulated into a matrix of instructions that statically determines serial execution, as well as instruction parallelism. For example, in the serial single program flow in FIG. 2A, the last instruction uses R3 as a source while the fourth instruction writes R3 as a result. This is mapped in the matrix template by placing the last instruction in a row that is subsequent to the row that the fourth instruction occupies. Line 214 illustrates this dependency.

Figure 2B:
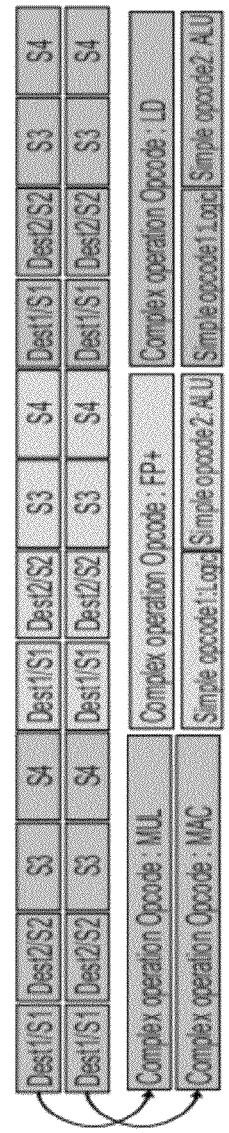
FIG. 2B illustrates the mapping of operations to an execution matrix of the invention.

The encoded instructions and their sources and destinations for the template shown in FIG. 2A are illustrated in FIG. 2b, where the instruction matrix template includes the opcode for the instructions and specifies the operands and result registers. Sources and destinations are separate from opcodes. This simplifies the decoding stage, the dependency resolution stage, and the register/memory read stage.

Figure 3:
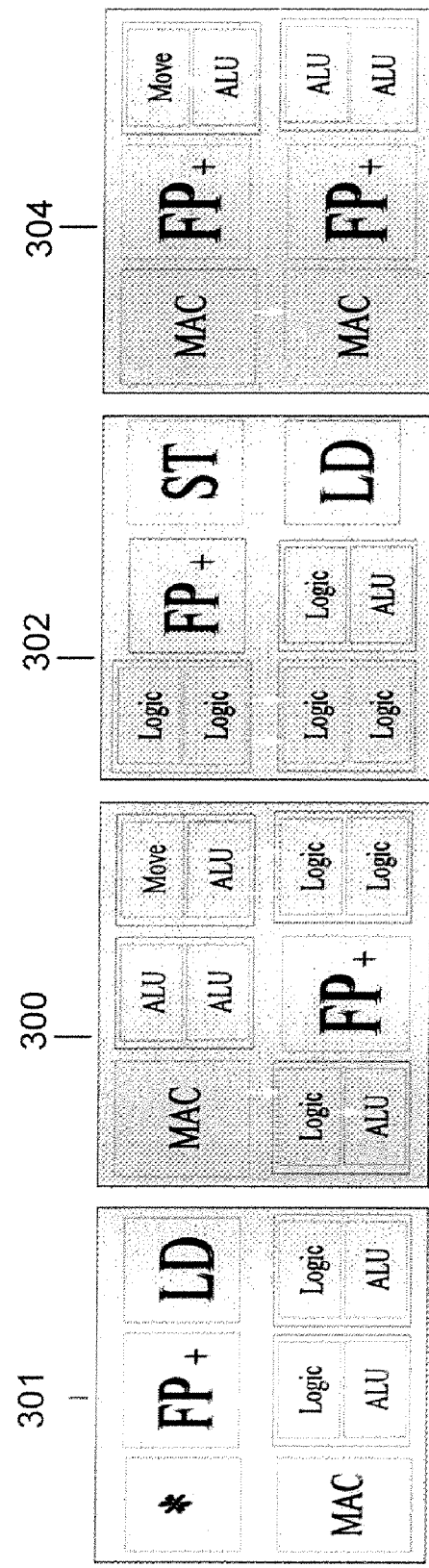
FIG. 3 illustrates a row of execution blocks that may be utilized in accordance with an embodiment of the invention.

Several instruction matrices can be issued simultaneously, as shown in FIG. 3. FIG. 3 illustrates the instruction matrix operation map of 201, represented here as 301, along with alternately configured instruction matrices operation maps 300, 302 and 304. Simultaneous issuance may be implemented using one of the following models:

1—MIMD or SIMD: Software/compiler glues multiple matrices into a super matrix.
2—Threaded model: Each matrix belongs to a separate software or hardware thread.
3—Dynamic execution: Matrices from a single stream can be dynamically issued by the hardware if no dependency exists between them.

Figure 4A:
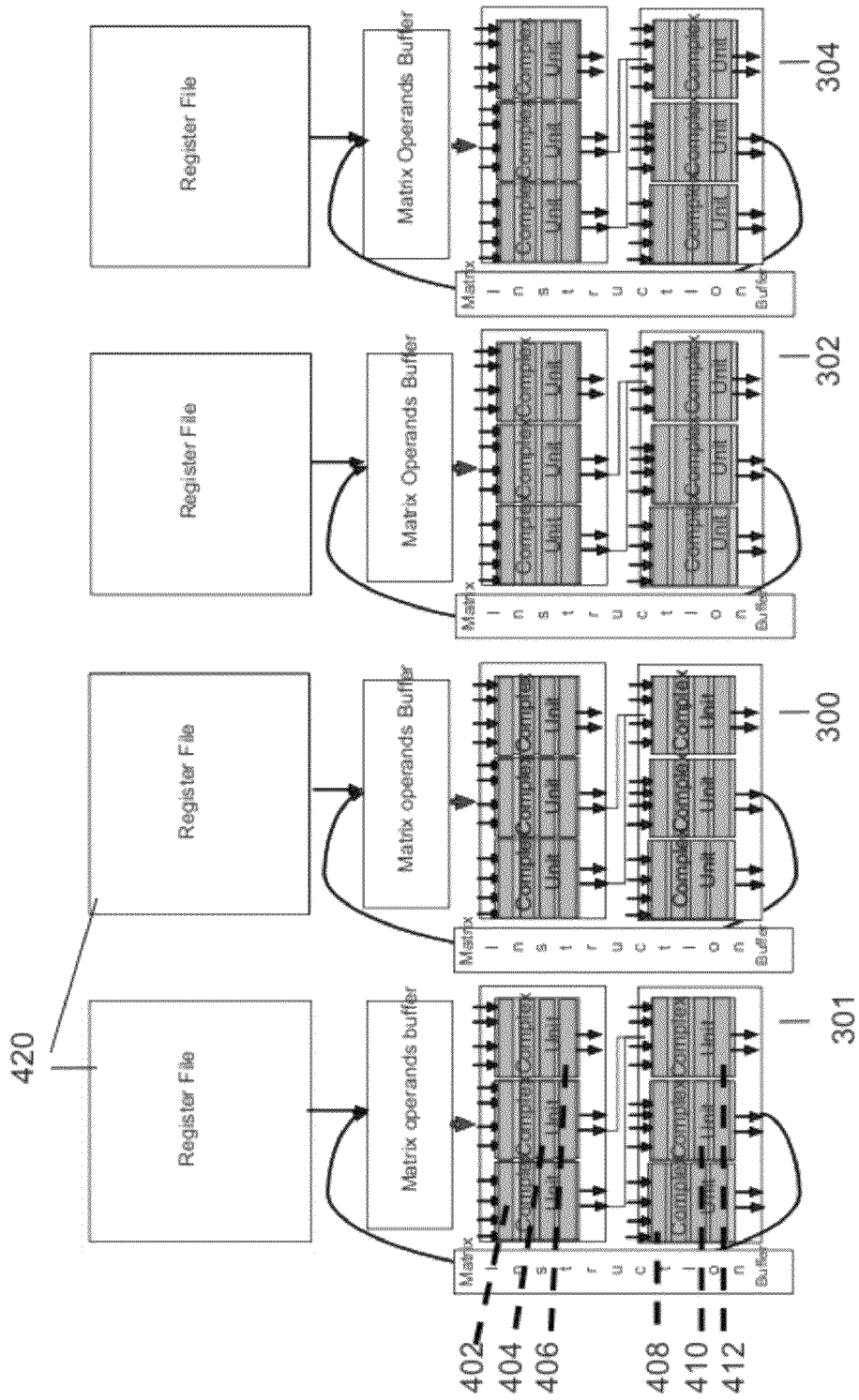
FIG. 4A illustrates execution blocks and supporting register files and buffers that may be utilized in accordance with an embodiment of the invention.

The instruction matrix templates represented by their operational maps in FIG. 3 are executed on a hardware that maps those instruction slots into execution units (inside the execution blocks) with a one to one correspondence. Granularity of the matrix allows forming a baseline matrix and combining those matrices to form a super matrix. This is illustrated in FIG. 4A, where 4 base-line instruction matrices execute in parallel on four execution blocks 301, 300, 302, and 304. Each execution block consists of 2 rows of complex units. The first row has 3 complex units (e.g., 402, 404, and 406) and another row with 3 complex units (e.g., 408, 410, and 412). Each complex unit can be operated to compute complex operations like a multiply, floating point add, or multiply-accumulate operations. Thus, for example, complex unit 402 may correspond to 202 of FIG. 2, complex unit 404 may correspond to 204 of FIG. 2, etc.

A complex unit can be operated to compute up to 4 simple operations, such as ALU operations. Such a complex unit is thus shown to have multiple operands and multiple outputs. The units can be arranged to compute parallel operations or be sequenced to perform dependent operations. Each of the base-line instruction matrices can be run independent of other matrices in a threaded mode or a number of them can be combined in a group that can be run in the same cycle as a super instruction matrix composing a MIMD architecture. The whole matrix can be executed in one cycle or could be pipelined over multiple cycles.

As an example of operating the execution engine shown in FIG. 4A to execute the ULIM instruction template of FIG. 3, instruction MAC 208 is executed in complex unit 408, while the pair of simple Logical and ALU operations 210 are executed in a pair of units of 408. FIG. 4A illustrates the similarities and differences with a VLIW architecture. If in FIG. 4A we use the top 3 slots (402, 404, 406) to execute 3 parallel instructions, then these 3 slots in the ULIM template would resemble an equivalent VLIW instruction. Using the next row of simple units (408, 410, 412) to execute 3 more parallel instructions will mean that we are executing another equivalent of a VLIW that depends on the previous one. Thus, the ULIM architecture can be viewed as executing in space and with a fixed lag of time a fixed number of multiple VLIW instructions that are dependent on each other. In addition, the architecture allows executing a single complex instruction or multiple simple instructions in one single slot, which is not allowed in VLIW templates.

The 4 ULIM matrices indicated by operation maps 301, 300, 302, and 304 in FIG. 3 can be executed on the hardware in FIG. 4A. This may implemented in one of 3 execution modes: either by being grouped together by the compiler/programmer to form a MIMD super instruction matrix, or each matrix can be executed independently in a threaded mode where separate threads execute simultaneously on each of the 4 hardware sections (301, 300, 302, and 304). The last execution mode possible is the ability to dynamically execute 4 different instruction matrices from a single thread using a hardware dependency check to insure no dependency exists between those different matrices that execute simultaneously on the 4 different hardware sections in FIG. 4A.

The register files 420 in FIG. 4A may be alternately configured depending upon the execution mode. In one mode, the register files are viewed as either an MIMD sectioned register file serving a MIMD width of 4 sections or they serve as 4 individual register files, each serving a separate thread. The register files can also support a dynamic execution mode where the 4 sections are one unified register file where data written to any register in a particular section is accessible by all units in the other sections. Switching between those modes can be seamless as different executing modes can alternate between individual thread baseline instruction matrix and MIMD super instruction matrix threads.

Each single instruction matrix is a mix of parallel and dependent instructions. Also, each individual instruction can be a scalar or SIMD instruction. At the finest granularity, the instruction can resemble variable data-width SIMD operating on multiple bytes/words or a single scalar entity.

In a multithread execution mode, each register file and its execution unit that executes a thread is totally independent of other register files and their threads. This is similar to each thread having its own register state. However, dependency between those threads can be specified. Each matrix that belongs to a thread will execute in the execution unit of that thread's register file. If only one thread or non-threaded single program is executed on the hardware in FIG. 4A, then the following method is used to allow parallel matrices belonging to that single thread/program to be able to access the results written into the registers in the other sections. The way this is done is by allowing any matrix writing results into any one of the 4 register file sections to generate copies of those registers in the other register file sections. Physically this is done by extending the write ports of each section into the remaining sections. However, this is not scalable, as we cannot build an efficient register file with each memory cell having as many as 4 times the write ports as needed for one section alone. We present a mechanism where the register file is built such that it will not be impacted with such single thread register-broadcast extension. Such a mechanism is shown in FIG. 4B.

Figure 4B:
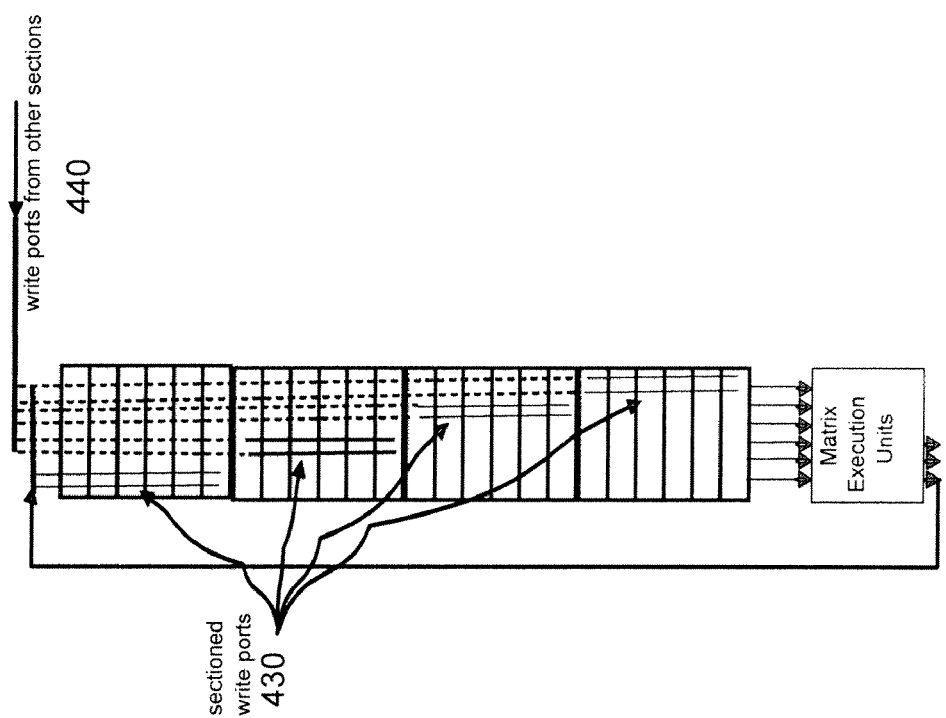
FIG. 4B illustrates a register file configured in accordance with an embodiment of the invention.

FIG. 4B shows one section of the register file consisting of 24 registers where a matrix that belongs to a single thread is storing the results of execution in that section's 24 entry register file. At the same time, 3 other parallel matrices are executing on the other 3 sections of FIG. 4A and the results of their execution are broadcasted to this register file section.

The way that the write ports are configured to enable single thread register broadcast is by limiting the results of each matrix to non-overlapping 6 register groups. This is implemented by having sectioned write ports where each write port writes into a separate group of registers 430. The write ports 440 coming from other sections will write into different non-overlapping groups of registers.

If this is a threaded mode or MIMD mode, then all the write ports that go to those non-overlapping groups are used by the results of this section to utilize and write to the full 24 entry register file and no broadcasting is done since other sections have independent code that uses independent registers (which means local section registers will need all registers to use). On the other hand, if a single thread is in use, then all the sections are cooperating on doing useful work for this single thread. The total registers in this case will be only 24, thus registers across the remaining sections (24 entries * 3 sections) can be used to hold copies among each other. This group assignment of the registers can be assigned by the compiler using analysis to determine if matrices could be parallelized and thus assign those matrices that have a chance of executing in parallel non-overlapping group of registers.

Even though the results are being written from all 4 sections, each memory cell in the register file only has ports to support one section. In traditional register files it has to have support for 4 sections, a four fold increase as illustrated in the following example.

The data parallelism in the ULIM is implemented in these architectures on top of the base line format of the ULIM. This is done by allowing each instruction in the ULIM template to be a SIMD/MIMD instruction. In the previous figure each parallel slot can support an internal replicated SIMD structure, while the MIMD is supported by the different parallel/serial slots.

The memory/register or matrix buffer being accessed by an instruction can be viewed differently depending on the intended access nature. For example, the data matrix could be viewed as MIMD of wide data elements, SIMD of small data elements or MIMD of mixed data width SIMD instructions.

Figure 5:
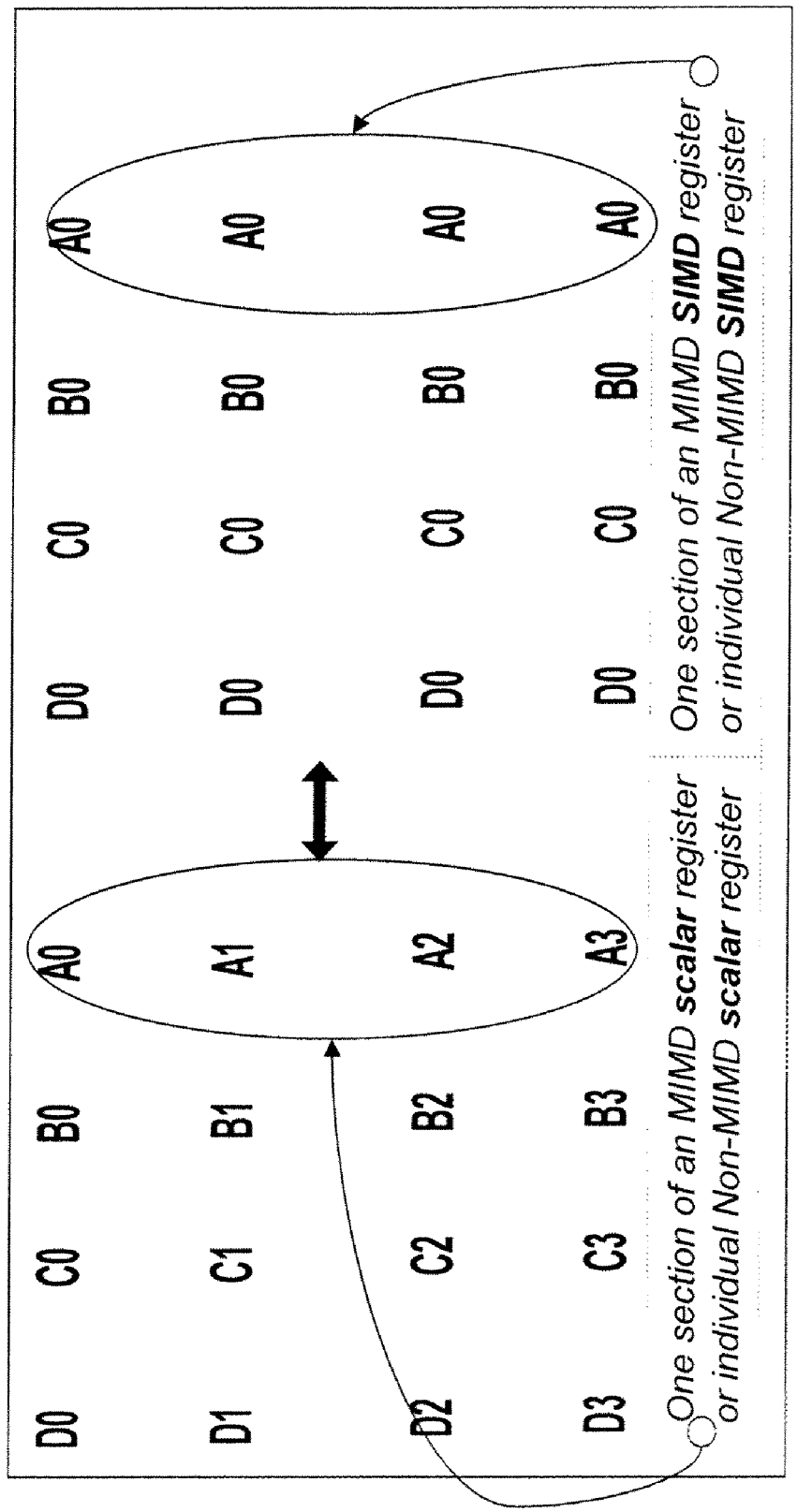
FIG. 5 illustrates various data configurations that may be utilized with a buffer of the invention.

In FIG. 5 there are 2 views of the memory/register matrix buffer layout of the data. The one on the right represents orthogonal data elements in each row and column. This supports different combination of MIMD/SIMD data. The view on the left represents different elements on each position of any row, but the column represents the remaining bits of a larger data size element. For example, the view on the right can represent 4 MIMD instructions each operating on 4 different SIMD bytes, where each is a byte of parallel data elements. While the one on the left represents 4 MIMD instructions, where each of these instructions operates on an element of 32-bits laid out vertically (actual physical layout will differ from the logical representation shown). Moreover, if the view is a MIMD view, then all belong to one single MIMD register of 4 sections, but if the view is non-MIMD view, then those registers are 4 independent registers laid out vertically.

The significance of this memory and register file view and its corresponding execution mode is that it enables the execution unit to morph to execute a wide MIMD/SIMD instruction (glue all register sections to form 4-way MIMD/SIMD), but at the same time the 4 register file sections and corresponding execution units attached can execute as 4 independent units acting on 4 different scalar registers, allowing single and multiple threaded execution within the execution unit at the lowest level of granularity.

The ULIM architecture has fixed size instruction templates similar to VLIW or MIMD templates. In contrast to VLIW or MIMD templates, the ULIM templates allow one to specify both parallel instructions as well as dependent instructions. It follows the same Von Neumann architecture of instructions writing into registers and dependency of instructions within a matrix communicated through register name dependency. One more noteworthy aspect of the ULIM architecture is that each instruction in the matrix has a fixed predetermined location in the matrix and executes in a fixed timing relative to other instructions in the matrix. The width of the ULIM matrix resembles the width of a corresponding VLIW template. Actually, it is always possible to transform serial flow of dependent VLIW instructions into a ULIM template by placing one VLIW instruction at one row of the horizontal rows of the ULIM template. It is not possible to resemble all possible ULIM templates using a flows of VLIW instructions because the ULIM template can include in the same row one complex instruction in one slot and multiple simple instructions in the horizontally adjacent slot.

The advantages of utilizing the matrix architecture composing a matrix of instructions as opposed to executing individual instructions as traditional architectures do are numerous. The following discussion illustrates mechanisms enabling and utilizing the invention's instruction matrix and execution block architecture to build and implement a massively-parallel single processor pipeline.

Figure 6:
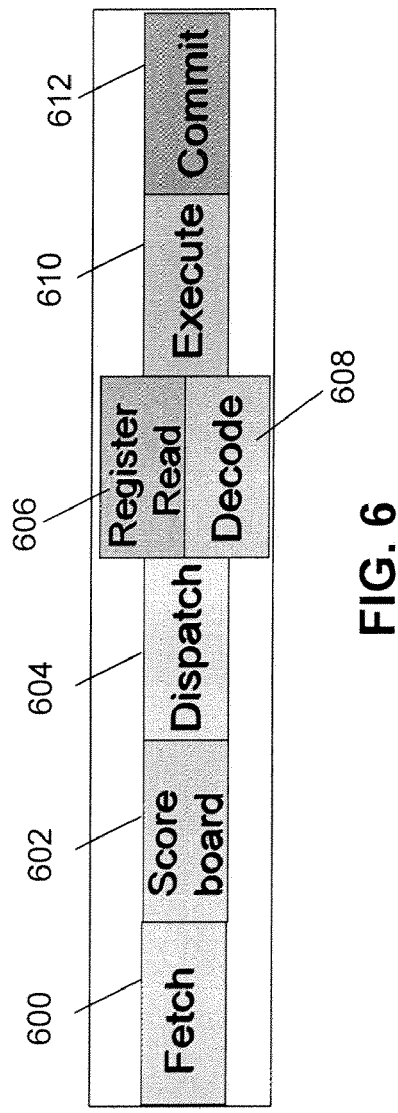
FIG. 6 illustrates a pipeline that may be utilized in accordance with an embodiment of the invention.

FIG. 6 illustrates a possible processor pipeline that takes advantage of a ULIM architecture. The invention utilizes a mechanism to simplify the fetch stage 600, branch resolution and decoding stage 608. The fetch unit 600 steps forward while fetching the code on an instruction matrix basis as opposed to an instruction basis. The program counter for such an architecture is incremented by the size of the matrix instead of being incremented by the instruction size. This means that in each cycle a large number of instructions are fetched. To be able to do that, the ULIM matrix will not allow a branch to exist within the ULIM matrix, but branches can exist between ULIM matrices. Branch resolution is done on 2 levels. Within the ULIM matrix, the branches are replaced with conditional execution, conditional moves and prediction. Across matrices, the branches are handled by path prediction and branch coloring. This allows large numbers of instructions grouped into matrices to be moved forward across the pipeline fetch and branch resolution stages.

Figure 7:
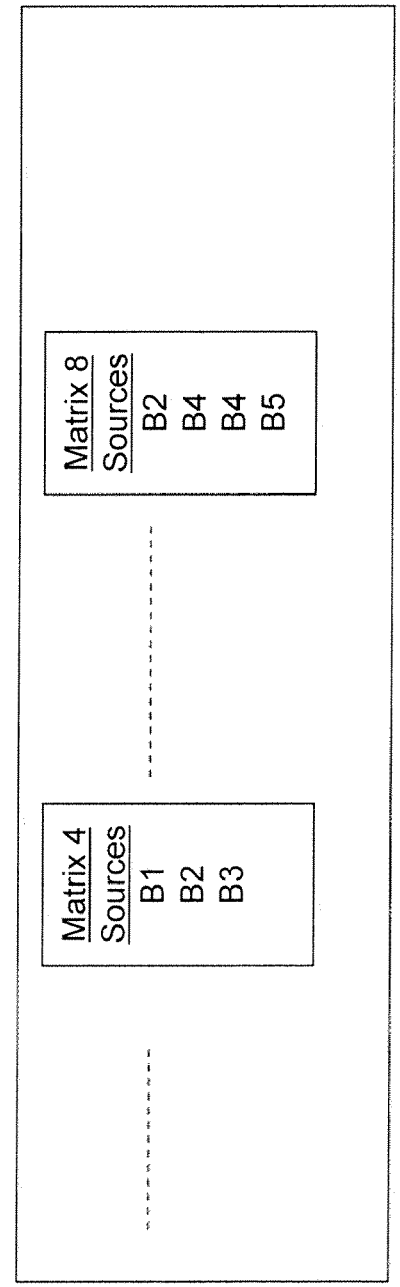
FIG. 7 illustrates matrix instruction processing in accordance with an embodiment of the invention.

Executing dependent instructions along side parallel instructions within a single matrix relieves the compiler from the difficulty of constructing all-parallel instructions slot code. It also simplifies the data dependence checking in the score board hardware 602 dispatch unit 604 or hardware scheduling unit. This is achieved by using the matrix number as a utility to enforce score boarding and dependency maintenance between matrices as opposed to using individual registers or individual instructions. In the example of FIG. 7, the score board characterizes the dependency precedence of matrix 8 by only referencing matrix numbers 2, 4 and 5, which means matrix 8 needs to read data results from those matrices. The score board dependency checking does not need to reference the individual register or instruction information to maintain the dependency score boarding. The matrix number carries that information and is enough to maintain correctness of dependency checking. Instructions within a matrix that depend on other matrices can be issued when those matrices are executed. The whole matrix is prevented from being dispatched when the matrices it depends on stalls (e.g., for a cache miss). In one embodiment of the ULIM pipeline implementation, the decode stage 608 is delayed until the stage just before execution, and it is done in parallel with the register read stage 606.

Figure 8:
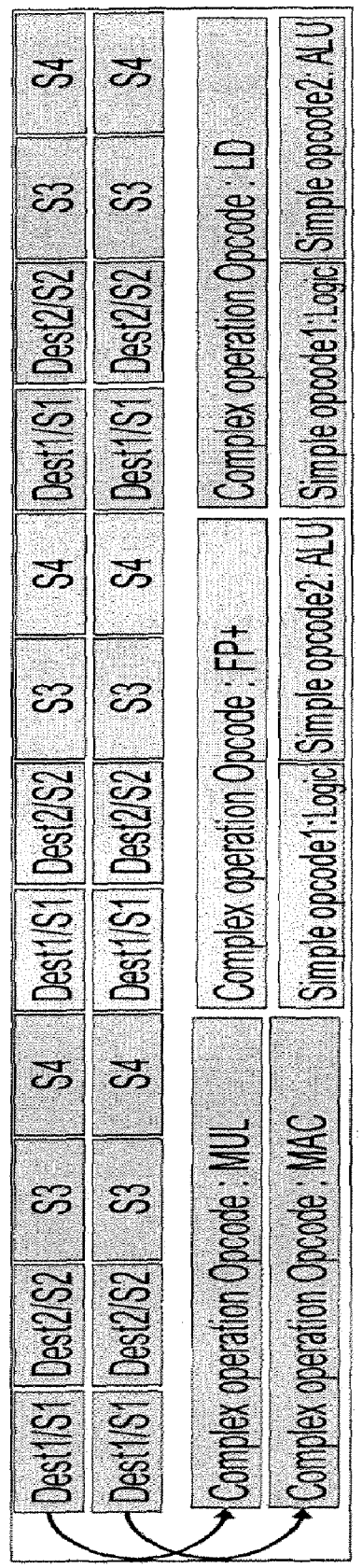
FIG. 8 illustrates the mapping of operations to an execution block of the invention.

FIG. 8 illustrates one implementation for encoding the instruction template of the ULIM architecture. The key is the encoding and organization of the operands (results and sources registers). The registers specifying instruction results and source operands are specified in a separate section of the ULIM template regardless of the opcode of the instructions and regardless of the fact that the instructions are complex operations or pairs of simple instructions. This matrix format that lists the sources and destinations in an explicit section of the matrix enables the source and destination registers to be extracted independent of the decoding of instructions within the matrix. It will thus be able to implement a delayed decode stage, where actual decoding of the individual instruction opcodes is delayed until just prior to the execution stage and will proceed in parallel with register read to enable execution on the next cycle. It also simplifies dependency resolution and scoreboard implementation.

If a slot includes a complex instruction, such as "Multiply accumulate" (MAC) then it requires 4 sources and writes back two results. If the same slot includes two simple instructions, such as a Logic and an ALU, then each requires 2 sources and writes back one result, which both combined requires 4 sources and generates two results. This makes the number of sources and results independent of the type of operation.

Processor execution hardware as shown in FIG. 4A includes register read and write mechanisms where a matrix operand buffer can assemble the required register sources and destinations based on physical location of where each source will execute on the respected hardware element of the matrix. This reduces the number of read and write ports and the bandwidth requirement on the register file. Using this characteristic of the matrix architecture, the bypassing mechanism is simplified where buffering the sources and/or the destinations in a matrix buffer that is close by or attached to each execution unit can provide shorter access time and larger source and results port bandwidth than a traditional register file, especially in the case of large size register file that needs to support so many individual execution units.

Figure 9:
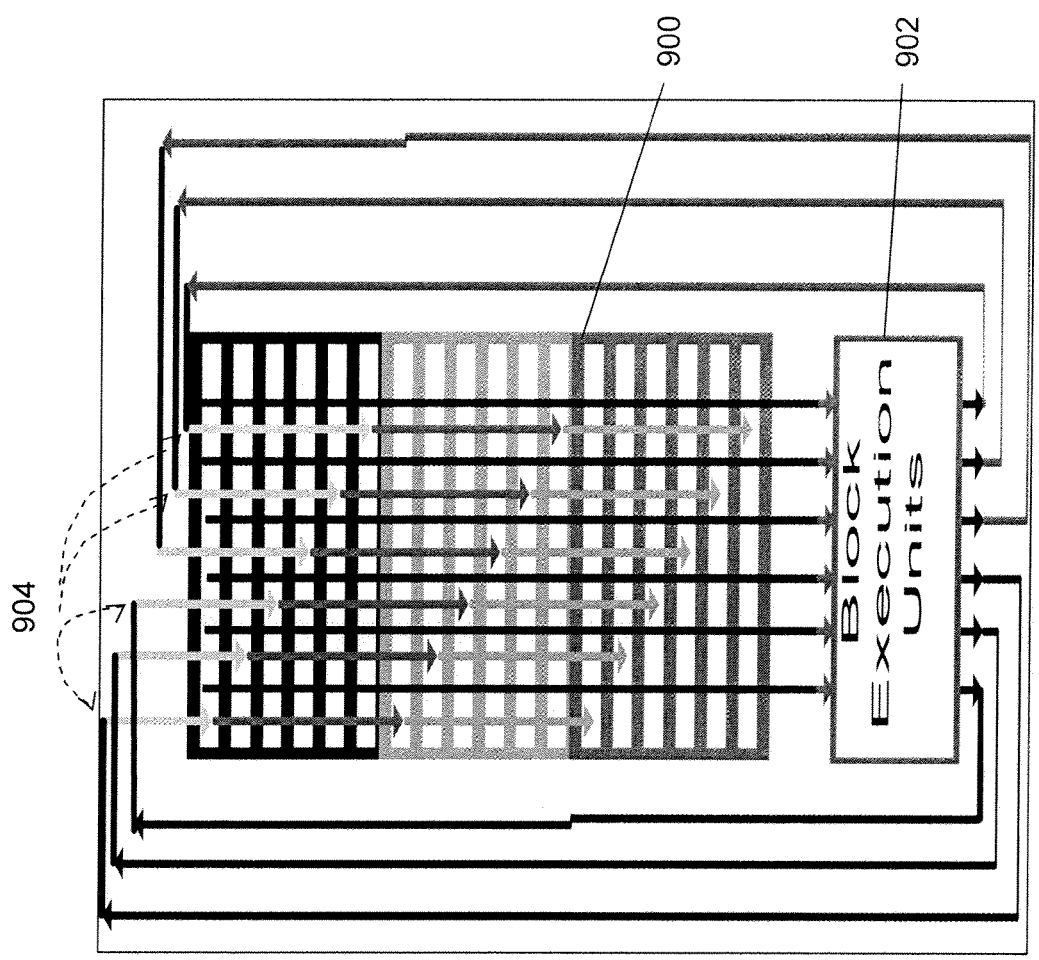
FIG. 9 illustrates a matrix buffer utilized in accordance with an embodiment of the invention.

FIG. 9 illustrates the concept of a matrix buffer of the invention. The figure shows the instruction matrix operand buffer 900 connected to the execution units 902. In this example, the instruction matrix operand buffer 900 buffers sources and destinations for 3 different matrices. Particularly important is the fact that write ports 904 are architected such that each write port writes to different memory cells. This means the matrix operand buffer memory cells are single ported even though there are 6 results that are written at the same time, which is equivalent to a traditional register file that is 6-way ported. Moreover, each write port has a fan out (cells that it needs to drive) equal to the number of matrices in the matrix buffer (only 3 in this example). These features have a lot of advantages in area, power and access speed, making this buffer design very scalable and attractive for high bandwidth high speed register file alternatives.

The following method describes how the registers are written and accessed from the matrix operand buffer. Each matrix is allocated to any available matrix space in the matrix buffer just in time or a short time before the matrix is ready for execution. Remote sources (e.g., sources that are not in other matrices storage within this matrix buffer) that the matrix needs to be able to start executing can be temporarily staged in this matrix storage.

After executing the matrix, results are written into the area allocated for this matrix storage (in one of the 3 matrix locations in the matrix buffer of FIG. 9). Each result is written into the corresponding location accessed by that result write port regardless of the result register number. This location along with the matrix location is communicated to the consuming matrices similar to the score board mechanism shown in FIG. 7, such that each matrix that depends on this matrix will annotate its register sources with the location of the matrix that those sources come from and location of each of the sources within the matrix. The result location within the matrix can be communicated at execution time by the execution hardware or can be embedded in the matrix instruction template alongside the source register number by the software since the matrix template is fixed at compile time.

The basic idea is to build a scalable design of sources and result buffers alongside register files where those buffers are connected to the execution units to allow higher bandwidth and speed by holding data temporary in a matrix location-based identification method establishing an intermediate medium between regular register files and execution units. Values in those matrix buffers can be accessed using the matrix location and the location of the source inside the matrix. For example, register 5 written by matrix 20 can be accessed by recording where that matrix is allocated in the matrix buffer and indexing that matrix's own storage by the entry number that the register 5 result physically occupies inside that matrix. However, after the matrix is de-allocated from the matrix buffer, then all the entries holding register values within the matrix will be written back into the actual register file and accessed by the register number from that moment onwards. The same location-based identification and access method discussed earlier for a register file using a matrix data buffer can be applied to memory accesses using a memory buffer cache.

The matrix architecture can be easily constructed by a compiler if the underlying hardware is uniform and replicated. It also allows for greater efficiency in utilizing the power and silicon area. Here we introduce the concept of a universal unit that is constructed from basic building elements, such as small adders, logical gates, multiplexers, and booth cells.

The architecture of the universal unit allows it to perform all functions/operations inside every single universal unit. This means each universal unit is capable of performing addition, multiplication, shift, permute, etc. The way it is able to perform such universal functionality is its composition out of basic building elements that are used to perform the simple ALU operations. On the other hand, those simple elements are cascaded to perform the complex operations. It also can process floating point and integer data. The universal unit concept is facilitated by the ideas described above, but it achieves an important advantage by simplifying the scheduling and utilizing the machine throughput to the maximum. In regular architectures, a separate unit is used to perform each operation or function. They share the same port of execution. Thus, when one unit is used, the rest are not utilized. Moreover, the latency in traditional architectures varies among them making it difficult for the scheduler to schedule them. In contrast, in this universal unit, latency is unified for the whole unit and the scheduler sees a symmetric instantiation of the universal unit.

Figure 10A:
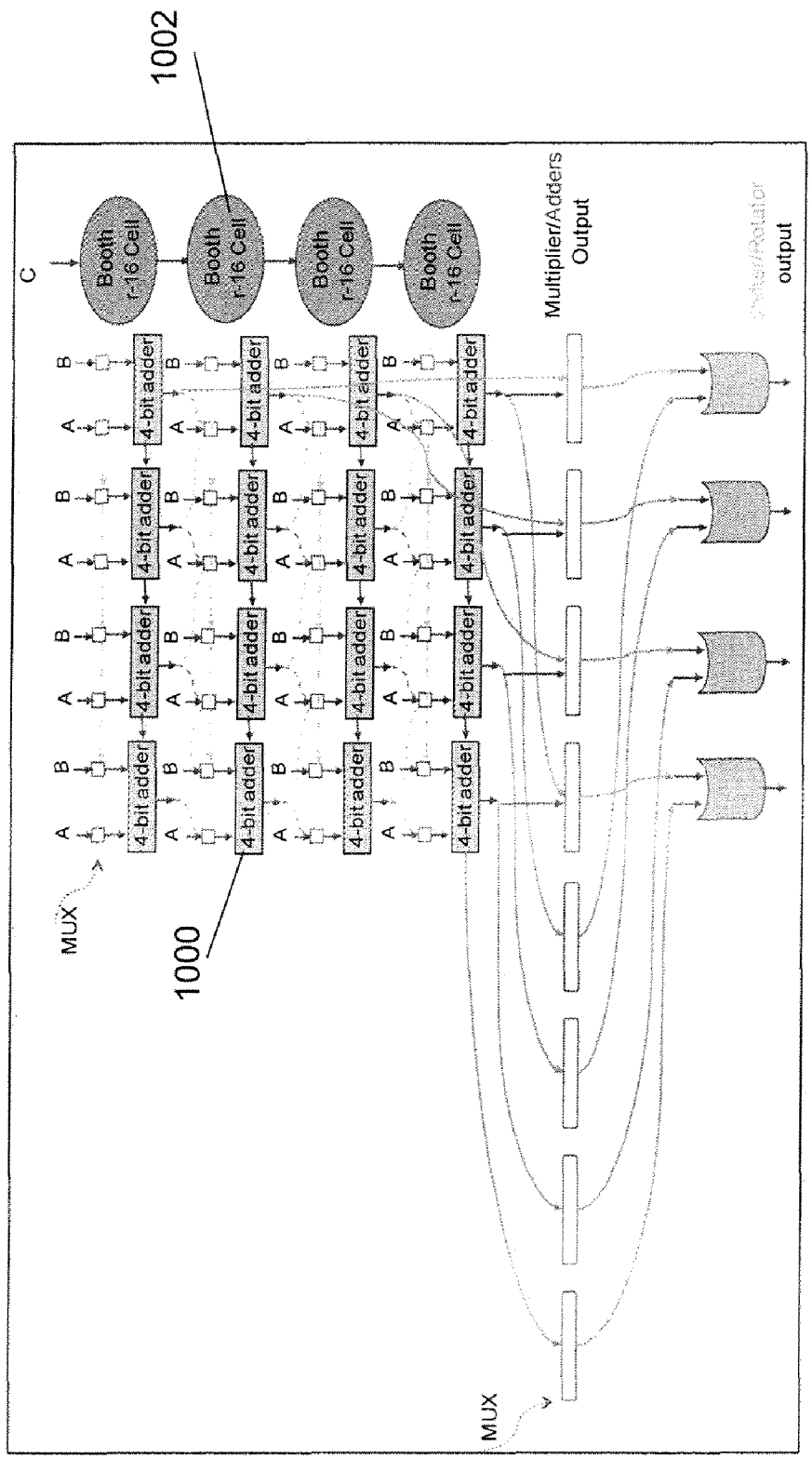
FIG. 10A illustrates a universal unit to implement operations of the invention.

FIG. 10A shows part of this universal unit. Each universal unit can perform different execution units' functions, such as a multiplier, adder, shifter, permuter, etc. This embodiment shows the structure with carry save adders and/or generic adders 1000. The Unit is composed of basic constructs, each one with 4 rows of adders (could be more or less adders) capable of adding 8 inputs in parallel (4 parallel/serial add operations). These adders are then structured in groups. Each adder in a row can be either connected to the same location adder in the row below (to perform serial ALU operation) or be connected to the adder to its right in the row below to perform a multiply operation. The operations can be C*B+A, or A OP B, in each row forming 4 parallel/serial ALU operations. In addition, it is possible for these groups of adders to have different data sizes. This structure of adders allows for a tree to perform multiple operand addition, multiplication, multiply accumulate, sum of difference, shifting and rotating. Additionally, multiplexers (not shown in the figure) will align/permute/shift the input or intermediate outputs to obtain the required operation, including shift and permute operations. Booth cells/bit multiply cells 1002 are added to the adders to enable multiplication. Other specific logic, state, memory, or LUT elements are added to provide expanded functionalities.

The universal unit allows the permute/shift unit to be implemented using the same structure that is used to perform the multiply operation or the structure that is used to do the floating point add or floating point multiply accumulate. This advantage allows less routes/area to implement a permute/shift logic. The way the shift or rotate is performed in a multiply structure is by performing a multiplication by $2^x$ where x is the shift count. Performing left shift, right shift or rotate is done by selecting the upper product of the multiply result or lower part or performing the OR function between lower and upper multiply result, respectively.

Each of the elements compose a group of bits using a basic 2-input adder structure. Carry-save-adders can also be built with logic and MUXES. For example, to build 32*32 elements, the basic groups can be constructed of 8 bits or 4 bits of basic adders and MUXES, and be able to perform logic functions using the modified carry look ahead adder cell internal logic gates.

Figure 10B:
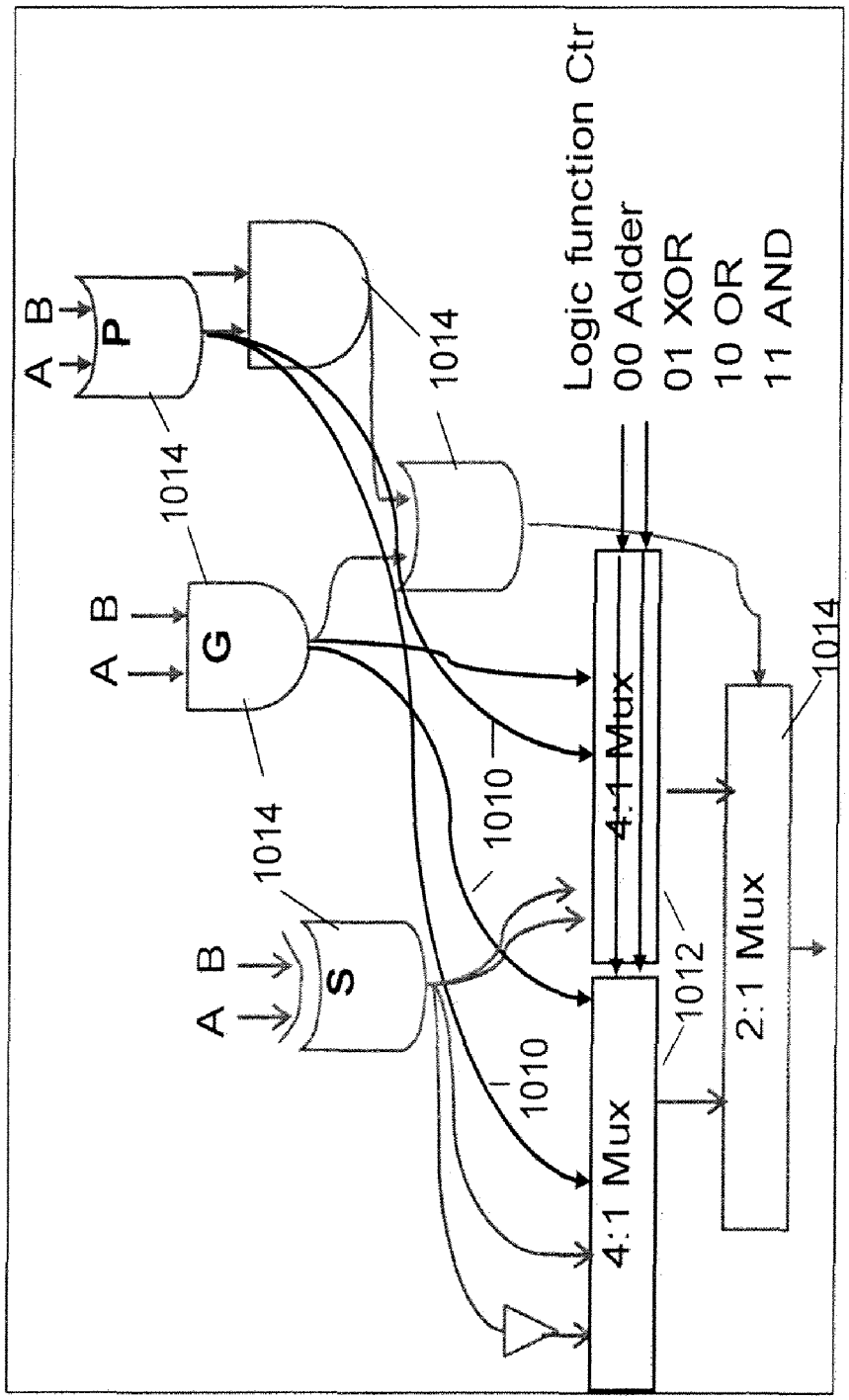
FIG. 10B illustrates a one bit cell of a carry look-ahead adder used in the 4-bit adder in FIG. 10A.

FIG. 10B shows the modified basic one bit cell of a carry look-ahead adder used in the 4-bit adder in FIG. 10A to produce either an adder output or a selected logic output. Modification is shown by connections 1010 and two 4:1 multiplexers 1012 that are not in the critical path of the adder. The original adder bit structure (marked as 1014) includes carry look ahead and sum logic. This figure is for logical representation, actual circuit may differ.

The 4-bit (or 8-bits) groups facilitate the execution of various size SIMD widths as well as 16-bit operations. By the same concept, those 16-bit tiles can be cascaded for larger width data operations, such as 64-bit operations, while still facilitating 8-bit, 16-bit and 32-bit SIMD operations of addition and multiple operand addition, shifting, rotating and multiplication.

The basic concept behind this organization is to be able to execute a combination of parallel and serial instructions on the same structure. For example, the first row of constructs can execute a single 32-bit ALU that can be followed by either a dependent or independent ALU on the $2_{nd}$ row and so on. The 4 rows together can execute up to four 32-bit ALU serial/parallel operations or a single 32-bit multiply operation. It can also perform partial width SIMD operations on the sub matrices. The instructions and operands scheduled on this universal unit come as one group, particularly within the matrix data and instructions section.

The ability to pipeline instructions within one cycle is possible using the instruction matrix architecture because we pipeline the dependent instructions to be scheduled within the same cycle or on the following cycle depending on the required frequency. There are multiple ways to take advantage of the ULIM architectures. The system allows for Ultra Large Instruction Matrix scheduling. Parallel instructions as well as dependent instructions are scheduled as a matrix (this is in contrast to VLIW where only parallel instructions can be scheduled). Each instruction or dependent instruction in this matrix can be scalar or SIMD.

The invention may be implemented in any number of ways. For example, multiple dependent instructions may be staged within a clock cycle. In this embodiment of the invention, multiple dependent and parallel instructions can be staged within one clock cycle. Multiple dependent instructions can start within one cycle; this reduces the optimum critical path of the program execution. Multiple dependent instructions may be pipelined with state elements, separating each basic operation in a unit from the following operation. This increases the rate of pipeline execution. However, the power of the design will increase because of clock speed and extra state elements. The state elements may stay constant, but the rate of data pumped through the design increases using wave pipelining.

The invention also includes a Time-Lag Sliced Architecture (TLSA) that accelerates the latency of dependent instructions. The basic idea behind the time lagged sliced architecture is that an operation produces its result digit slice by digit slice. Each slice is produced earlier than the next slice with a time lag between slices. Once the first slice is produced, the next computation can start execution and produce its own slice. The sliced architecture described here is an overall architecture that applies to computational units as well as register files and memories. The architecture applies to all arithmetic, shift, integer and floating point operations.

The TLSA is used to implement an entire system architecture, including memory and computations. The digit slices are not necessarily equal sized digits. The invention can operate with both operands arriving in a digit sliced manner. The invention can implement a booth encoded multiplier, variable shifters, permute engines, as well as floating point adders and multipliers.

In designing execution units, the common methodology is to synchronize the digits or bits of a digit of the output result of an arithmetic/logical or shifter unit as one single output result. This result is either latched into a storage element or staged synchronously as one piece to a receiving element. However, in this architecture fine grain execution is provided with or without coarse grain synchronous execution. The basic philosophy is to formulate the arithmetic or permute/shift operation in such an organization of time lag logic slices that are staged in time and/or space. The execution hardware is connected in a time delay flow, where early slices execute faster and produce slices of the output results faster, while later slices need more time to execute and produce results in a delay relative to earlier slices. It is worth mentioning that the slices are done on fine granularity of bits/digits within even a single execution unit, like an adder or permuter. This architecture can utilize such organization of digit/bit logic slices to optimize logic timing critical paths and/or number of signal routing paths and/or area for performing arithmetic, permute, shift, etc. for both integer and/or floating point operations. The slices can be of equal number of bits/digits or different number of bits/digits. One particular advantage of this architecture is the ability to start executing dependent instructions before all the output result slices of the source instruction are finalized.

Figure 11:
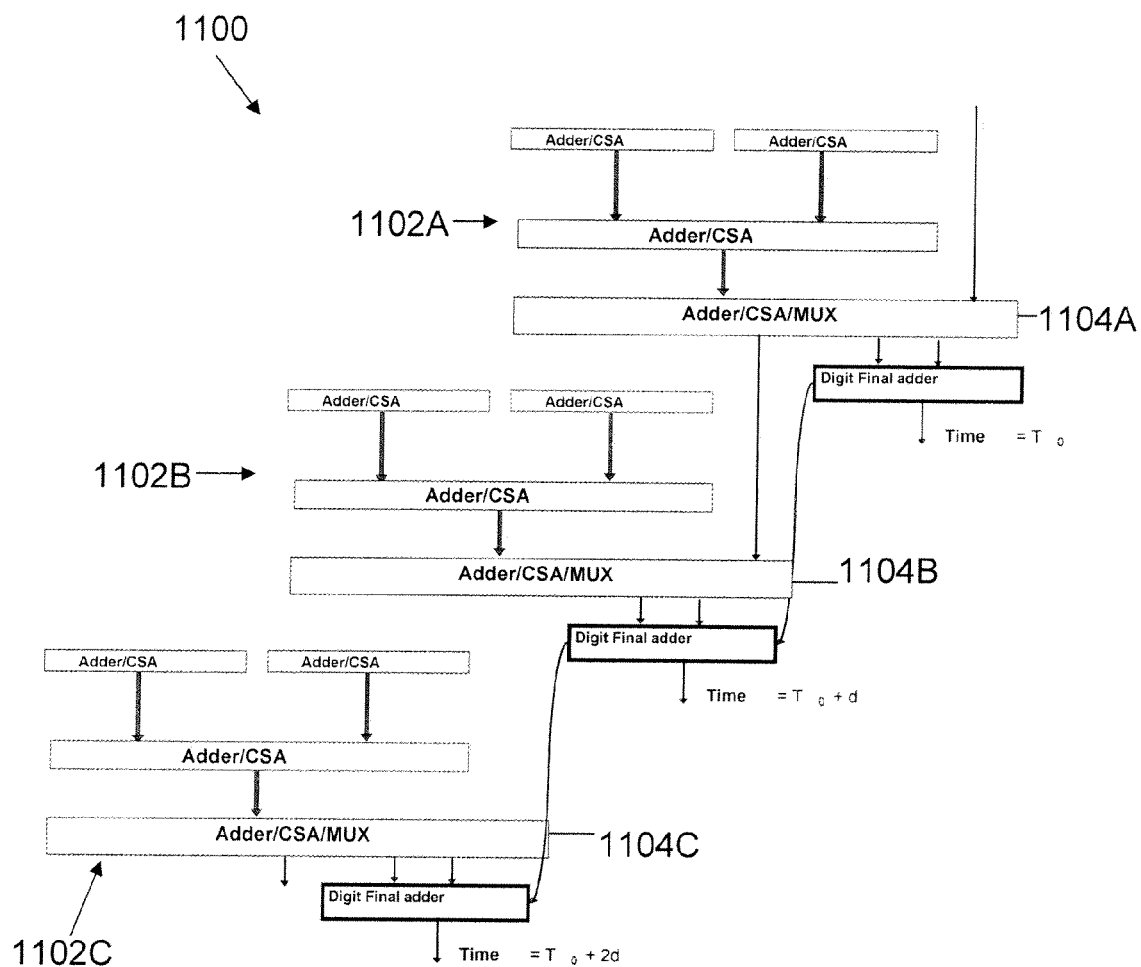
FIG. 11 illustrates a Time-Lag Sliced Architecture (TLSA) unit configured in accordance with an embodiment of the invention.

FIG. 11 illustrates a TLSA unit 1100 where data flows in and out of slices 1102A-1102C. Each slice output has a lag time delay (d) with respect to a previous slice. This time-lag nature allows the unit to be pipelined such that state elements of the different slices are not synchronized to one time, as is typical for row/stage flip flops.

The architecture of FIG. 11 includes a basic adder stage structure that computes basic computation tasks, such as multiple operand addition or sub-block multiplication. Those computations are cascaded using staging elements 1104A-1104C that are not part of the critical path of the basic task. The staging elements can be adders, multiplexers, or logical gates, depending upon the basic computational task that is being sliced. The delay of these staging elements 1104 is minimal and equal to time "d", which is the delay between each slice output and the next slice output.

The staging element is chosen to have the smallest delay possible, as it also establishes the delay of the input operand slices between themselves. The basic computational task in FIG. 11 can use arbitrary levels of adders. Those adders can be any type, e.g., binary or Carry Save Adders (CSA). The architecture of FIG. 11 has the advantage of producing the first slice of the result earlier than the final result. The first slice is forwarded to subsequent operations.

Figure 12:
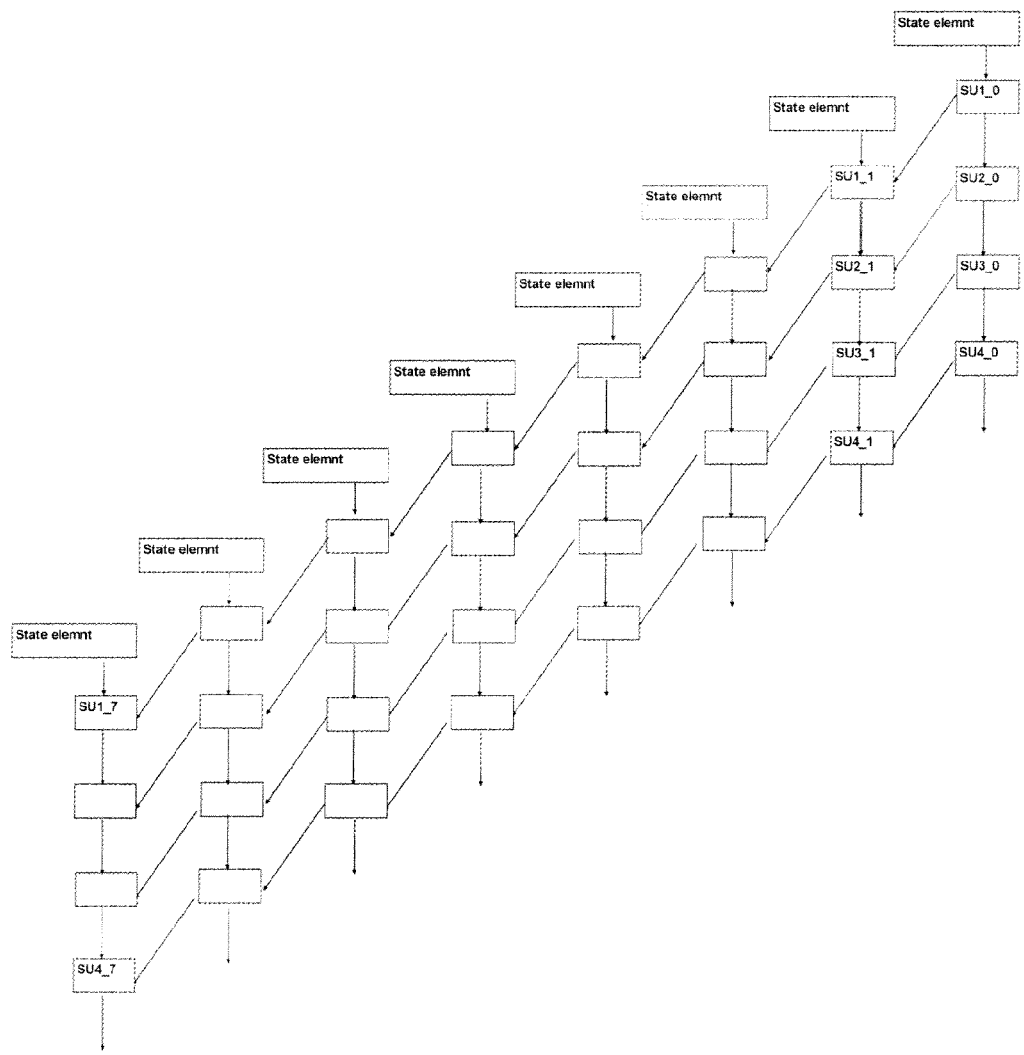
FIG. 12 illustrates multiple TLSA units in a staggered configuration in accordance with an embodiment of the invention.

FIG. 12 illustrates one embodiment of the invention where multiple time-lag sliced units are staggered back to back. In this embodiment, each diagonal slice represents an instruction computation unit divided into slices. Here each slice starts execution at a lag in time with respect to a previous slice. Each unit feeds a subsequent unit. This embodiment shows four units back to back. The notation SU1_0 refers to Slice number 0 of unit number 1. SU4_7 refers to Slice number 7 of unit number 4.

The architecture shown in FIG. 12 allows (if desired) for multiple TLSA units to process data in a single cycle (or in multiple cycles). A low slice of a first unit feeds the low slice of a second unit and this in turn feeds the third and then the third feeds the forth, etc. It is also important to notice that in addition to the first slice of the first unit feeding the first slice of the second unit, it also feeds the second slice of its own unit (the $1_{st}$ unit). FIG. 12 illustrates the following concepts:

1—Sub-cycle/multi-cycle execution in TLSA

TLSA allows for the execution of the arithmetic/shift/logic operations within one cycle. FIG. 12 illustrates this where 4 units are executed in one cycle, where each slice has a delayed version of that clock cycle. By the same token, the pipelining can be done at the output of each unit slice (instead of output of 4) to increase the throughput and execute in multiple cycles.

2—Asynchronous/Synchronous/Wave TLSA topologies

The TLSA can be designed in at least 3 different topologies or combinations of those topologies:

A—Asynchronous: where slices' inputs/outputs are communicating with each other within the cycle time without synchronous state elements (e.g., flops). This allows for removal of internal pipeline state elements and enables power friendly slower clock domains.

B—Synchronous: each slice is clocked into a state element (Flop/Latch/domino, etc). This allows for a higher clock throughput and pipelining rate.

C—Wave: in this topology, the data is fed into the unit slice by slice, with the next input data coming at a rate that is faster than the normal pipelining rate. Normal pipeline rate is determined by the maximum time of logic paths between two state elements. Wave pipeline is determined by minimum time of logic paths between two state elements.

One interesting combination of topologies is Fine Grain Asynchronous-Coarse Grain Synchronous (FGA-CGS). In this scheme, the TLSA is implemented using time lag slices that are connected asynchronously, where fine grain asynchronous execution is provided with or without coarse grain synchronous execution. The basic philosophy is to formulate the arithmetic or permute/shift operation in such an organization of sliced staged processing where the execution of the different slices of the execution hardware is asynchronously connected in a time delay flow where early slices have less inputs and execute faster and produce their output results faster. Later slices have more inputs, thus need more time to execute and produce results in a delay relative to earlier slices. Each slice is then clocked in a synchronous (or asynchronous) element that has a time lag with respect to the previous slice.

FIG. 12 illustrates multiple TLSA units staggered within one cycle (4 back to back units within 1 clock), at the same time the implementation illustrates a FGA-CGS implementation where unit slices communicate with each others in an asynchronous manner (fine granularity asynchronous), while each slice or back to back slices are synchronized at the output to a state element clock. Each output of the slices may be synchronized to a different clock (delayed version).

The TLSA architecture supports the Ultra Large Instruction Matrix (ULIM) architecture. In this TLSA embodiment, a whole instruction group is scheduled where multiple parallel and dependent instructions are scheduled on instantiation of the TLSA cluster shown above. Each unit can also support SIMD data where duplicates of the data slices are instantiated, but controlled by the same instruction excitation. Additionally, multiples of this assembled structure of SIMD Universal Units can be instantiated horizontally to implement a MIMD architecture on top of a single unit. This way a whole instruction template containing both parallel variations of SIMD instructions and dependent instructions is scheduled in a cycle.

Figure 14:
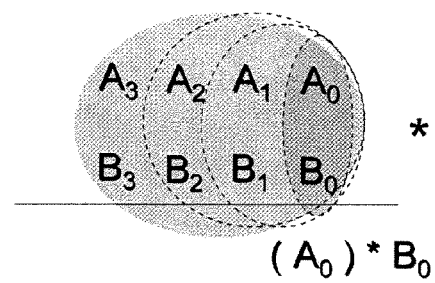
FIG. 14 illustrates a time-lag multiplication technique utilized in accordance with an embodiment of the invention.

FIG. 13 illustrates a traditional multiplication technique. In particular, each B digit is multiplied against the set of A digits, each of those digits must be available at the multiplication execution unit at the initiation of multiplication. The results are then summed. In contrast, with the present invention, as shown in FIG. 14, operands arrive digit by digit. It can be seen that each row of FIG. 14 represents a partial product of the multiplication operation, but contains only current arriving and previously arrived digits with respect to digit slice arrival times.

Figure 15:
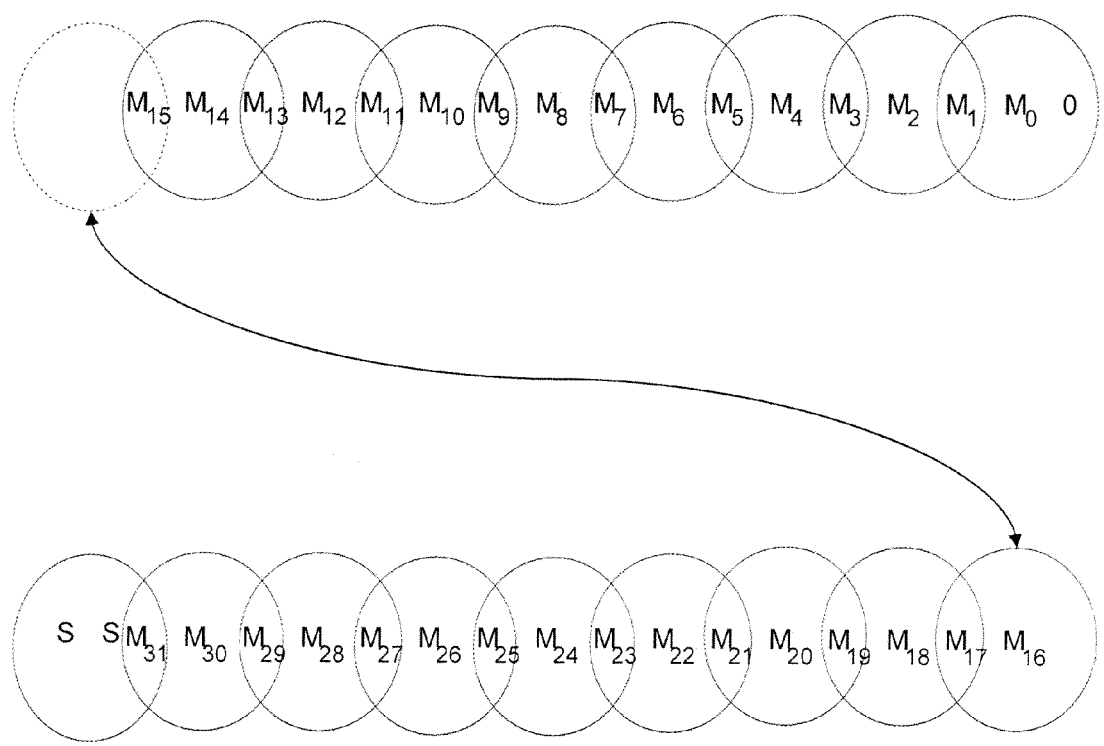
FIG. 15 illustrates prior art Booth encoded multiplication.

To demonstrate how to build the logic structure that uses Booth encoded multiplication to execute the time delay sliced architecture, FIG. 15 illustrates a traditional Booth encoded 32-bit regular multiplier. The Booth encoder groups consecutive multiplier bits together to generate a digit. This grouping can reduce the maximum digit value that represents those bits by considering the signed combinations of the 2 consecutive digits in the number. For example, a 3-bit digit has a maximum value of 7, but by adding 1 to the value of the digit to its left, then the digit 7 is now equivalent to −1. Using signed representations of the digits allows values of those encoded digits to reach a maximum value of ½ of the original digit values.

Figure 16:
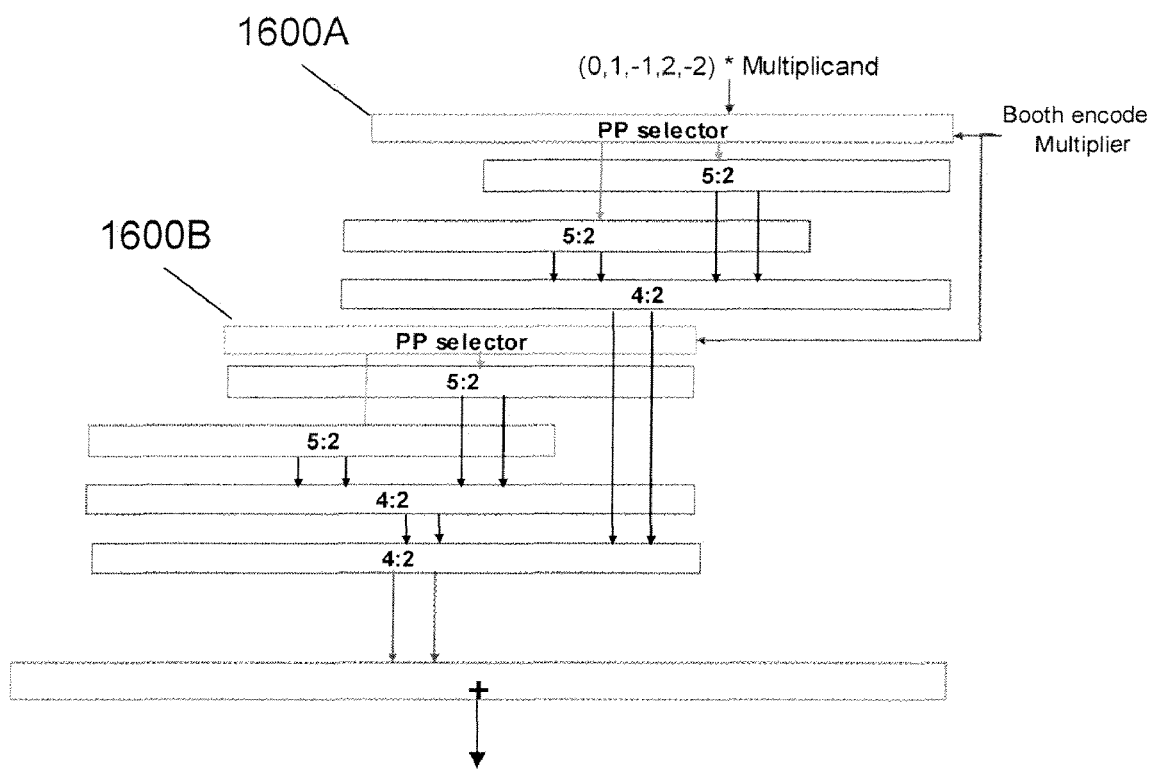
FIG. 16 illustrates logic to implement the Booth encoded multiplication of FIG. 15.
Figure 17:
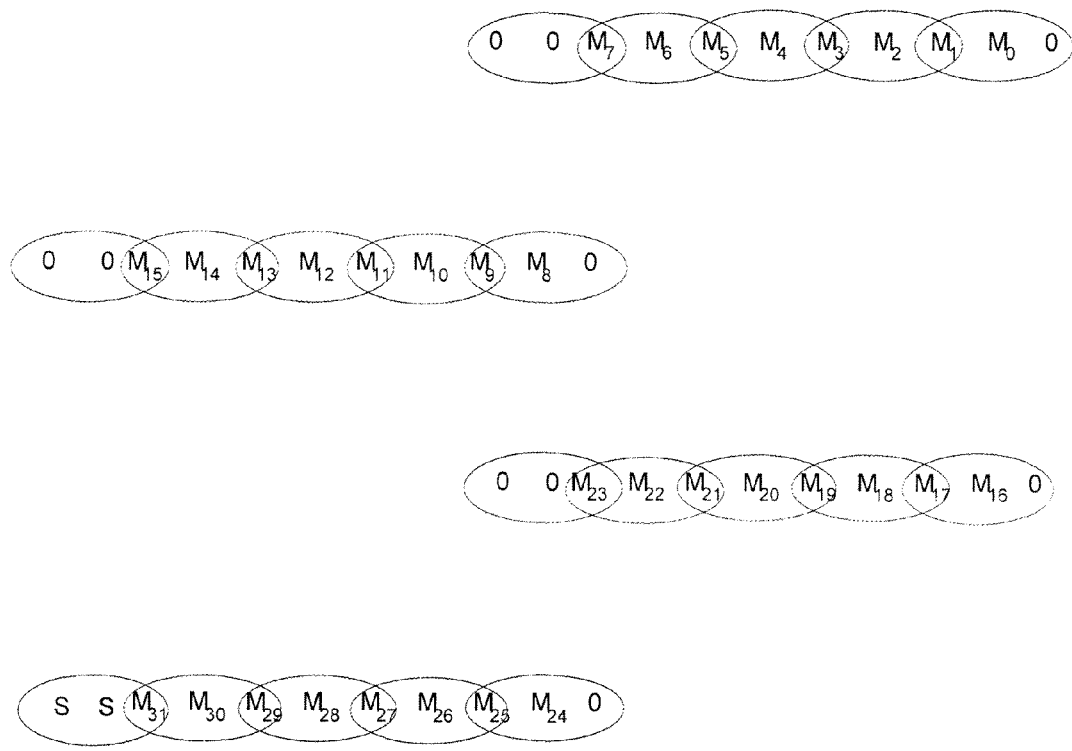
FIG. 17 illustrates Booth encoded multiplication in accordance with an embodiment of the invention.
Figure 18:
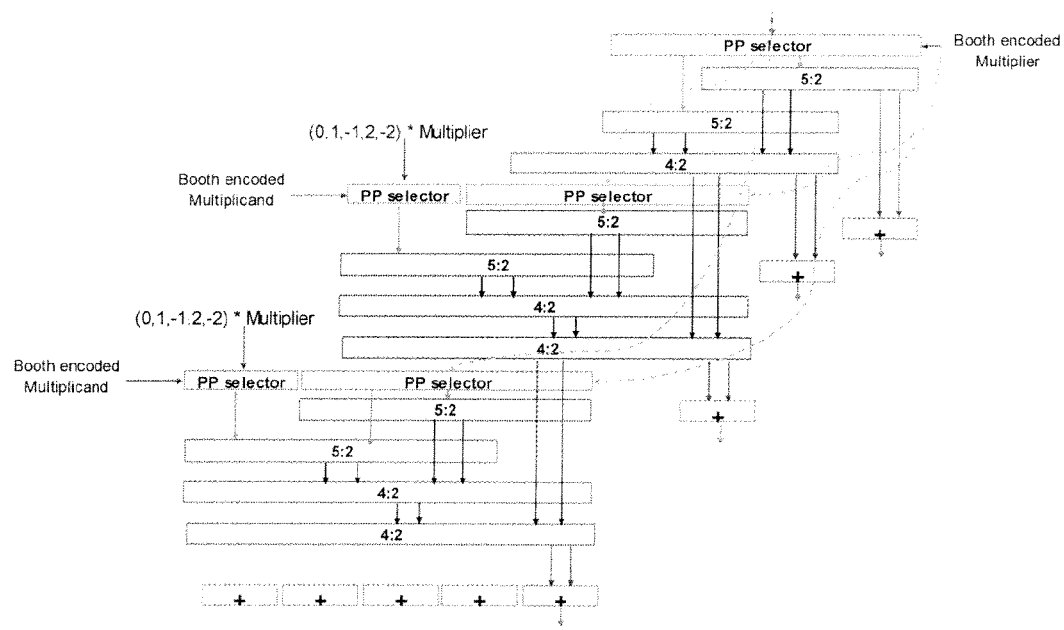
FIG. 18 illustrates logic to implement the Booth encoded multiplication of FIG. 17.

FIG. 16 implements the traditional logic structure of the regular Booth multiplication shown in FIG. 15 using radix-4 digits. The selectors 1600A, 1600B choose which multiple of the multiplicand to use out of the possible signed values (0,1,−1,2,−2); the choice is determined by the Booth encoding of the multiplier bits FIGS. 17 and 18 show the new Booth encoded scheme and the new TLSA logic structure to implement it. Notice that a traditional multiplier has a continuous encoding of the stream of bits, while the TLSA Booth encoder inserts 0's in the stream at the boundaries of the digit slices (in this example a digit of 8 bits). The inserted zeros do not change regardless of the sign of the multiplication (the last 2 bits represent the sign).

FIG. 18 shows how to implement the new modified time-lag sliced Booth encoded 32-bit multiplier. This implementation resembles the generic TLSA structure shown in FIG. 11. FIG. 18 implements sub-multiplication operations illustrated in FIG. 14 and FIG. 17.

Figure 19:
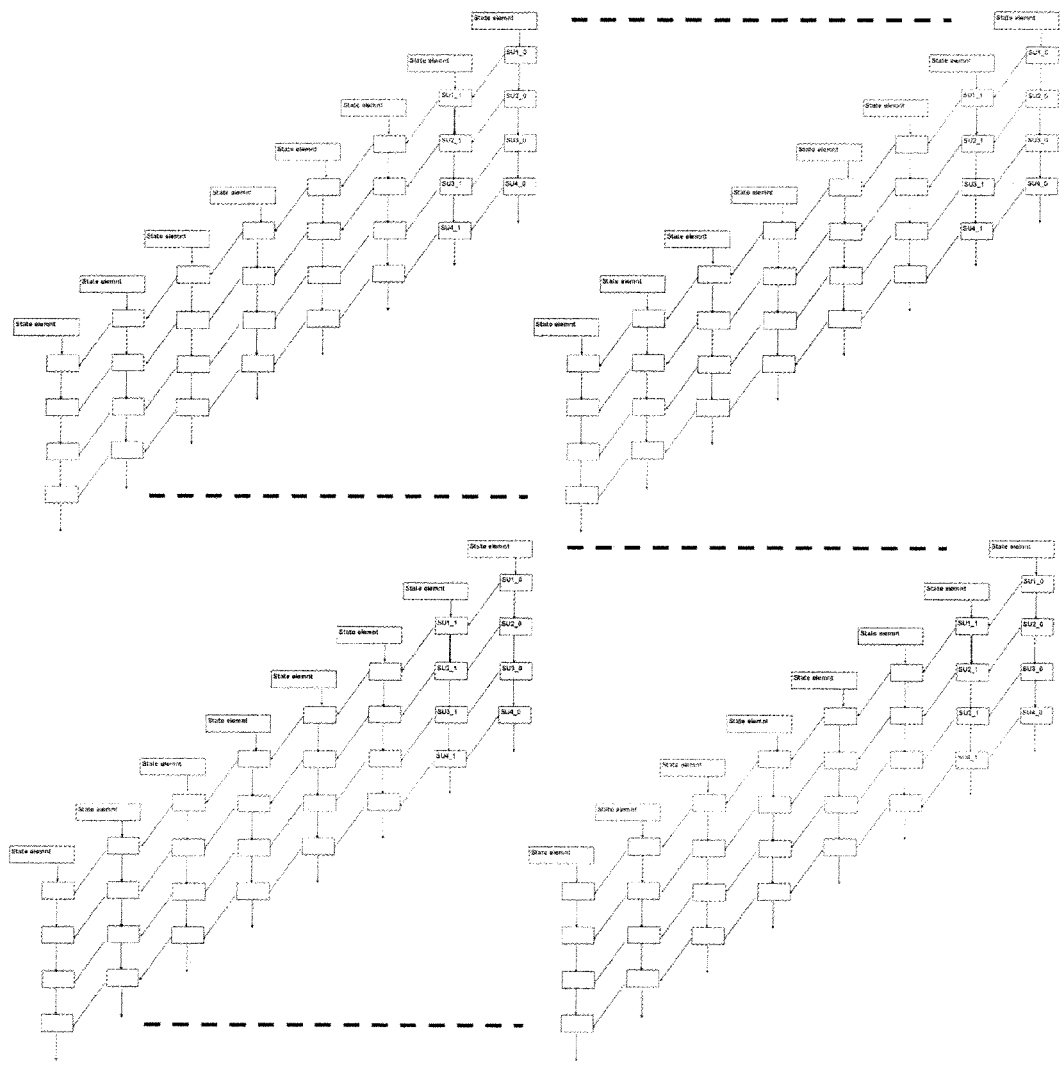
FIG. 19 illustrates a memory/register file data block configured in accordance with an embodiment of the invention.

The data parallelism in the TLSA is implemented in these architectures on top of the base line format of the TLSA. This is done by allowing each instruction in the TLSA data format of the SIMD/MIMD to be organized in an orthogonal dimension to the TLSA slices. FIG. 19 shows a configuration where a memory/register file data block is accessed by an instruction that can be viewed differently depending on the intended access nature. For example, the data block could be viewed as MIMD of wide data elements, SIMD of small data elements, MIMD of mixed data width SIMD instructions, etc. FIG. 19 illustrates an architecture to execute such combinations. The slices within the unit can operate independently to perform sub-operations. For example, each slice of 8 bits can perform independent 8-bit multiplication, while the group of slices that construct one 32-bit multiplier unit can also be operated as a 4-way SIMD byte multiplier. On the other hand, the group of units can be operated as a MIMD multiplier.

Figure 20:
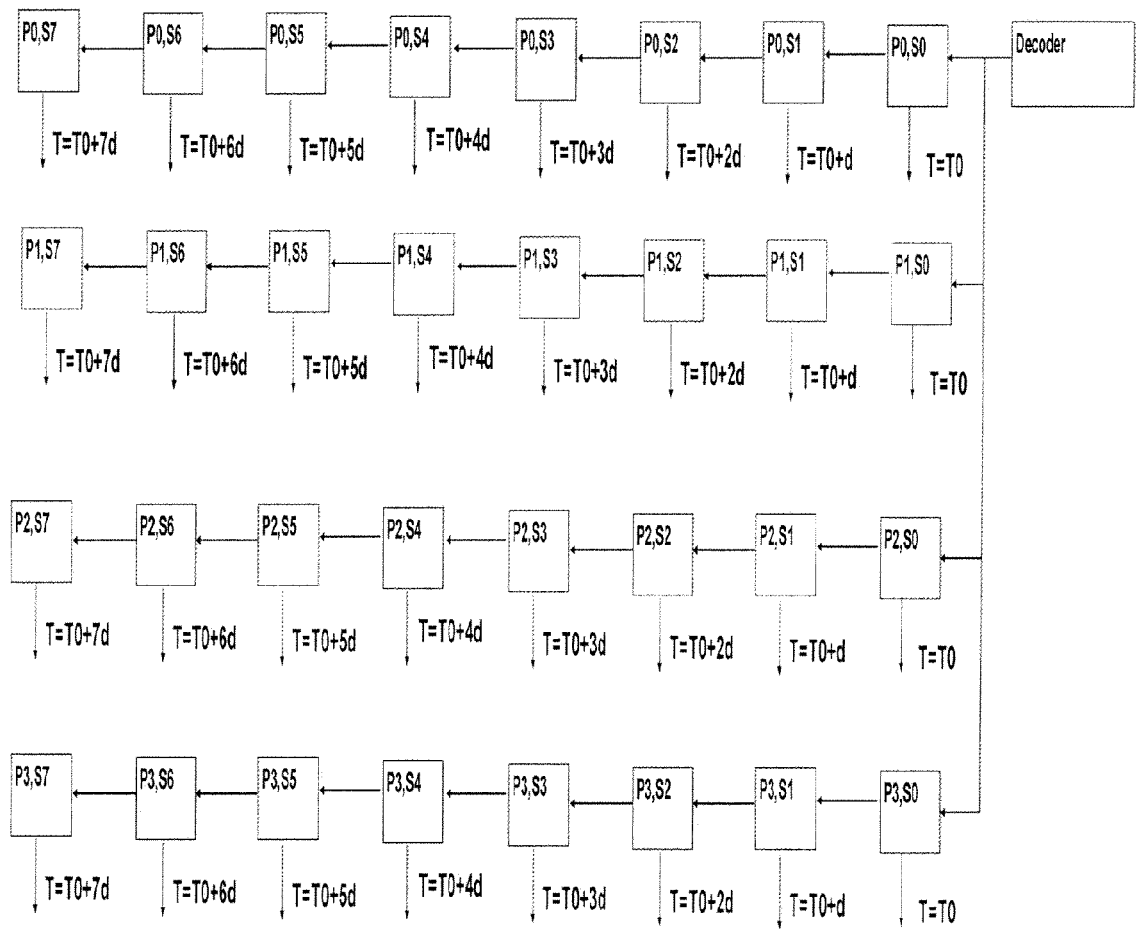
FIG. 20 illustrates a time slice memory configured in accordance with an embodiment of the invention.

FIG. 20 illustrates a memory that is accessed in a sliced manner. In traditional memory architectures, a single operand (e.g., a 64-bit integer or floating point operand) is fetched as a whole. After the address decoding is finished, all the bits are read through the read port, which has to buffer the read enable across the whole width of the operand size in memory. In the TLSA architecture, after the decoding of the address occurs, the data read and/or write occurs on a time lag model of a slice following a previous slice with a time delay in between. The benefit of this model is the fast memory response when it is not necessary to decode and drive the whole data width at once.

Figure 21:
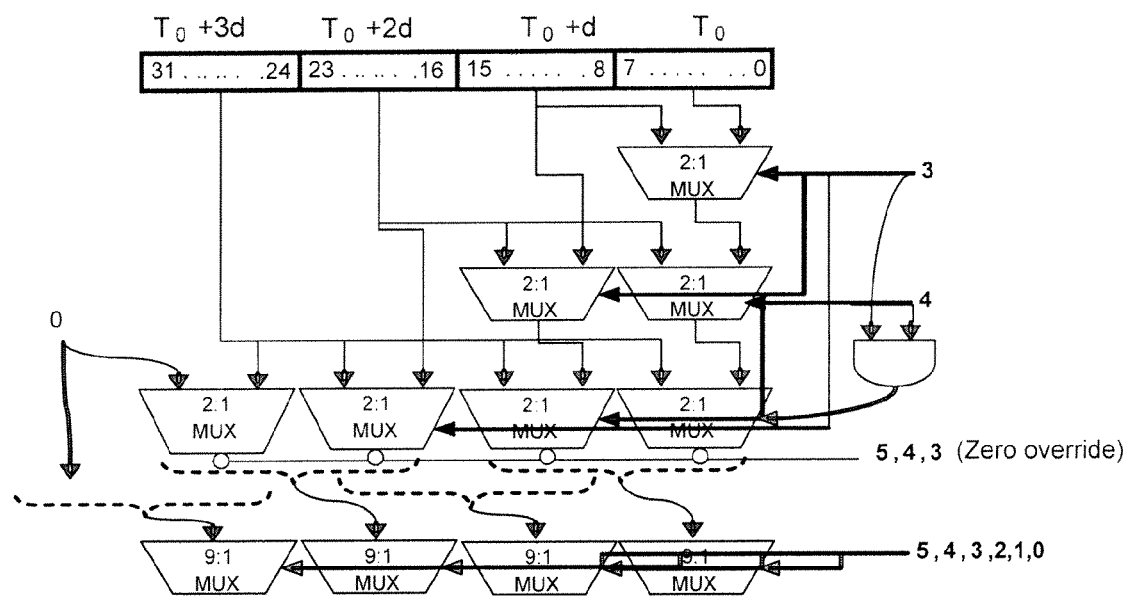
FIG. 21 illustrates a TLSA architecture with a permute/shift unit configured in accordance with an embodiment of the invention.

FIG. 21 illustrates a TLSA architecture with a permute/shift unit that takes advantage of the time lag between data slices. This advantage allows faster time to produce early result slices and/or less routes/area to implement a permute/shift logic. In FIG. 21, a right shifter is constructed to take the time lag arrival of a 32-bit operand sliced in 8-bit digits. The first slice (digit) of the 32-bit input arrives at time $T_0$, while the last slice arrives at time $T_0+3d$, where d is one MUX delay. The bits (0 to 5) shown vertically on the right side represent the shift count (maximum of 32, any value>32 generates an output of zero, basically all data is shifted out). The execution starts with the arrival of the first low order digit from the right side of the shifter. The unit then waits for the next input digit to arrive. One of the digits is selected to the lower digit position depending on the value of bit 3 of the shift count, which will determine if the number will be shifted by 8 bits to the right. Then the next most significant digit arrives and a choice is made to select this new digit or pass the data that was selected in the upper multiplexer levels using the next bit in the shift count and so on. Any multiplexer position where the shift count will zero out that location will implement a zero override to its output. When the last digit arrives, it goes through the least number of multiplexer levels and thus will have a minimum delay "d" with respect to the previous digit to enable a fast propagation of the last digit to the output.

A left shifter can be constructed with the structure of FIG. 21 mirrored about a vertical line where left slices have larger stacks of multiplexers and right slices have smaller stacks of multiplexers. The most significant digit passes through the least number of multiplexer levels.

The sliced architecture universal unit can be a universal unit similar to the one described in FIGS. 10A-10B. It uses the same techniques of the sliced architecture (TLSA) and/or fine grain asynchronous concepts. It performs all functions/operations inside every single universal unit. This means each universal unit is capable of performing addition, multiplication, shift, permute, etc. The way it is able to perform this universal functionality with low latency is the ability to process the individual slices one at a time in a time lag fashion. It also can process floating point and integer data. The universal unit concept is facilitated by the ideas described above, but it achieves an important advantage by simplifying the scheduling and utilizing the machine throughput to the maximum. In regular architectures, a separate unit is used to perform each operation or function. They share the same port of execution. Therefore, when one unit is used the rest is not utilized. Moreover, the latency varies among them making it difficult for the scheduler to schedule them. In contrast, in this universal unit, latency is unified for the whole unit and the scheduler sees a symmetric instantiation of the universal unit.

Each universal unit can perform different execution units' functions, such as a multiplier, adder, shifter, etc. In addition, it is possible for these slices to have different data sizes. In this particular illustration, each slice is larger in data width than the previous slice. This structure of adders allows for a tree of slices to perform multiple operand addition, multiplication, multiply accumulate, sum of difference, etc. Multiplexers (not shown in the figure) align/permute/shift the input or intermediate outputs to obtain the required operation, including shift and permute operation using the universal structure of adders/multiplexers. Booth cells/bit multiply cells are added to the adders to enable multiplication. Other specific logic, state, memory, or LUT elements are added to provide expanded functionalities.

Figure 22:
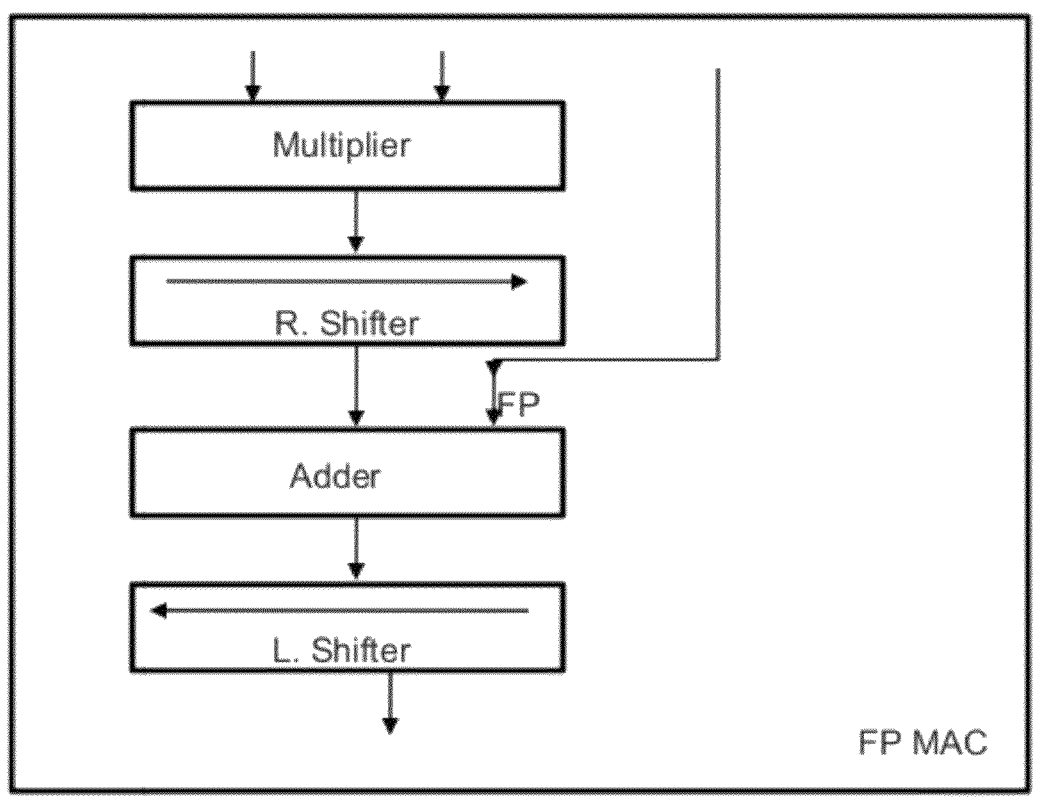
FIG. 22 illustrates a floating point multiply accumulate unit configured in accordance with an embodiment of the invention.

The ULIM architecture can be time sliced using the disclosed TLSA techniques. One other way to construct a Universal unit is to configure it as a Floating point multiply accumulate unit (MAC). The functions used in building this unit are Multiplier, Right Shifter, Adder, and Left shifter. Such a structure as disclosed in FIG. 22. A Universal unit can utilize such a structure to perform any one or combinations of those functions that construct the FP-MAC.

Each one of those functions has been described earlier and therefore can be implemented individually as TLSA structures and then be combined to operate as a floating point multiple accumulate TLSA structure. Such a structure can also operate as a consecutive sliced ALU or multiply followed by an ALU or shift, etc.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a memory storing a matrix of instructions;
a pipeline comprising a decoder to decode the matrix of instructions and a matrix of execution units to execute the matrix of instructions, the matrix of instructions includes a set of instruction rows and instruction columns, each instruction within the same row across all columns is executed in parallel by a corresponding sub-set of execution units of the matrix of execution units and instructions dependent upon source instructions of an instruction row are in a subsequent instruction row of the matrix of instructions;
a first sub-set of execution units corresponding to a row of the instruction matrix computes and forwards first data results to a second sub-set of execution units of a subsequent row of the matrix of execution units in a single clock cycle and without pipeline buffering;
the second sub-set of execution units separately receives, from the matrix of instructions, instructions dependent upon the first data results;
the second sub-set of execution units in the same single clock cycle, and without pipeline buffering, computes and forwards second data results to a third sub-set of execution units of a subsequent row of the matrix of execution units; and
the third sub-set of execution units separately receives, from the matrix of instructions, instructions dependent upon the second data results;
wherein the matrix of instructions is one of a plurality of matrices of instructions;
wherein the matrix of execution units is one of a plurality of matrices of execution units; and
wherein the plurality of matrices of execution units is alternately operative to:
execute combined instruction matrices forming a super instruction matrix;
independently execute instruction matrices in a threaded mode where separate threads execute simultaneously on execution units; and
simultaneously execute different, non-dependent instruction matrices.

2. The apparatus of claim 1 wherein the matrix of execution units produces slices of digital output at different rates.

3. The apparatus of claim 2 wherein different digits have different bit widths.

4. The apparatus of claim 1 wherein the matrix of execution units includes modified Booth encoding.

5. The apparatus of claim 4 wherein the modified Booth encoding inserts zeros at digit slice boundaries.

6. The apparatus of claim 1 wherein the matrix of execution units includes a right shifter with first sliced digits applied to a first stack of multiplexers and second sliced digits applied to a second stack of multiplexers, wherein the first stack of multiplexers is larger than the second stack of multiplexers.

7. The apparatus of claim 1 wherein the matrix of execution units includes a left shifter with first sliced digits applied to a first stack of multiplexers and second sliced digits applied to a second stack of multiplexers, wherein the second stack of multiplexers is larger than the first stack of multiplexers.

8. The apparatus of claim 1 further comprising a memory with a time lag configuration to produce a first slice of data followed by a time lagged second slice of data.

9. The apparatus of claim 1 further comprising a floating point multiply accumulate unit configured to implement multiplication, addition, right shift, left shift, and shuffle operations.

10. The apparatus of claim 1 wherein each matrix of instructions has a matrix number to enforce dependency maintenance between the matrices of instructions.

11. The apparatus of claim 1 wherein the matrix of instructions includes Single Instruction Multiple Data (SIMD) instructions.

12. The apparatus of claim 1 wherein the matrix of instructions includes a Multiple Instructions Multiple Data (MIMD) instructions.

13. The apparatus of claim 1 wherein the matrix of instructions includes a combination of Single Instruction Multiple Data (SIMD) instructions and Multiple Instructions Multiple Data (MIMD) instructions.

14. The apparatus of claim 1 wherein the matrix of instructions is formed by a run time system.

15. The apparatus of claim 1 wherein the matrix of instructions is formed by hardware.

16. The apparatus of claim 1 wherein the matrix of instructions is formed by a compiler.

* * * * *